United States Patent
Slaney-Smith et al.

(10) Patent No.: US 12,180,771 B2
(45) Date of Patent: Dec. 31, 2024

(54) DOCK DOOR ACCESS APPARATUS

(71) Applicant: E TRACK LIMITED, Solihull (GB)

(72) Inventors: Adam Slaney-Smith, Solihull (GB); David Alan Woodfield, West Midlands (GB); Alan Page, Birmingham (GB); Richard Comley, Solihull (GB); David Rathbone, Solihull (GB)

(73) Assignee: E Track Limited, Solihull (GB)

( * ) Notice: Subject to any disclaimer, the term of this patent is extended or adjusted under 35 U.S.C. 154(b) by 29 days.

(21) Appl. No.: 17/974,700

(22) Filed: Oct. 27, 2022

(65) Prior Publication Data
US 2023/0127254 A1    Apr. 27, 2023

(30) Foreign Application Priority Data

Oct. 27, 2021 (GB) .................................. 2115443.0
Jun. 15, 2022 (GB) .................................. 2208784.5

(51) Int. Cl.
*E05F 15/76*      (2015.01)
*G06K 7/14*       (2006.01)
(Continued)

(52) U.S. Cl.
CPC ............ *E05F 15/76* (2015.01); *G06K 7/1417* (2013.01); *G07C 9/29* (2020.01);
(Continued)

(58) Field of Classification Search
CPC ...... E05F 15/76; E05F 2015/767; G07C 9/29; G06K 7/1417; E05Y 2400/44; E05Y 2400/45; E05Y 2400/856; E05Y 2900/106
See application file for complete search history.

(56) References Cited

U.S. PATENT DOCUMENTS 4,819,570 A * 4/1989 Bailet ..................... E05G 1/005
                                                     109/23
8,596,100 B1 * 12/2013 Crispell ................ E05B 13/001
                                                       70/56
(Continued)

FOREIGN PATENT DOCUMENTS

| JP | 04078732 A | * | 7/1990 | |
|----|----|----|----|----|
| WO | WO-2015166339 A1 | * | 11/2015 | ......... A61B 1/00066 |
| WO | WO-2016201355 A1 | * | 12/2016 | ........... B60R 13/105 |

*Primary Examiner* — Chico A Foxx
(74) *Attorney, Agent, or Firm* — Reichel Stohry Dean LLP; Mark C. Reichel; Natalie J. Dean

(57) ABSTRACT

A warehouse dock door control system (101) has a system controller (147), an interior side unit (144), an exterior side unit (142) comprising a key repository and a key detector. The key detector is configured to detect and identify a specific vehicle key having unique identification data associated therewith. The key detector is configured to detect the presence of the key within the key repository and to read the identification data associated therewith. The controller is configured to use the identification data to determine whether the vehicle key is an authorised vehicle key. In response to the determination, the controller communicates with the interior side unit to authorise opening of the dock door and controls the exterior side unit to secure the vehicle key in the key repository to inhibit removal therefrom until a signal is received indicating that a loading or unloading process is complete.

19 Claims, 21 Drawing Sheets

(51) Int. Cl.
*G07C 9/29* (2020.01)
*E05F 15/73* (2015.01)

(52) U.S. Cl.
CPC ..... *E05F 2015/767* (2015.01); *E05Y 2400/44* (2013.01); *E05Y 2400/45* (2013.01); *E05Y 2400/856* (2013.01); *E05Y 2900/106* (2013.01)

(56) References Cited

U.S. PATENT DOCUMENTS

| | | | | |
|---|---|---|---|---|
| 10,319,167 | B1* | 6/2019 | Oesterling | G07C 9/00896 |
| 10,494,205 | B1* | 12/2019 | Hoofard | G06Q 10/083 |
| 10,682,980 | B1* | 6/2020 | Ghamsari | G06F 21/31 |
| 2001/0006368 | A1* | 7/2001 | Maloney | G08B 21/023 |
| | | | | 340/568.1 |
| 2005/0269414 | A1* | 12/2005 | Kell | G07C 9/00896 |
| | | | | 235/492 |
| 2006/0132284 | A1* | 6/2006 | Murphy | E05F 15/74 |
| | | | | 340/5.71 |
| 2007/0182582 | A1* | 8/2007 | Booher | G07C 9/00309 |
| | | | | 340/5.72 |
| 2010/0244768 | A1* | 9/2010 | Ghabra | H02J 50/10 |
| | | | | 320/108 |
| 2011/0022222 | A1* | 1/2011 | Tonegawa | B60L 8/003 |
| | | | | 320/109 |
| 2012/0249289 | A1* | 10/2012 | Freese | G07C 9/21 |
| | | | | 340/5.7 |
| 2013/0117078 | A1* | 5/2013 | Weik, III | G06Q 10/00 |
| | | | | 705/13 |
| 2015/0077239 | A1* | 3/2015 | Litjen | B60L 53/16 |
| | | | | 320/109 |
| 2016/0060899 | A1* | 3/2016 | Duncan, Jr. | E05B 19/04 |
| | | | | 70/456 R |
| 2017/0320685 | A1* | 11/2017 | Hoofard | E06B 3/44 |
| 2018/0022366 | A1* | 1/2018 | Huck | G07C 9/00896 |
| | | | | 105/422 |
| 2018/0080280 | A1* | 3/2018 | Bodurka | G05B 19/042 |
| 2019/0144218 | A1* | 5/2019 | Hoofard | B65G 69/005 |
| | | | | 52/173.2 |
| 2020/0180881 | A1* | 6/2020 | Hoofard | H04L 67/125 |
| 2020/0265128 | A1* | 8/2020 | Leigh | G06F 21/44 |
| 2021/0079710 | A1* | 3/2021 | Evans | E05F 15/73 |
| 2022/0153152 | A1* | 5/2022 | Pancutt | B60L 53/16 |
| 2022/0405695 | A1* | 12/2022 | Bowman | G06Q 10/0639 |
| 2023/0169449 | A1* | 6/2023 | Hoofard | G06K 7/1417 |
| | | | | 705/14.62 |

* cited by examiner

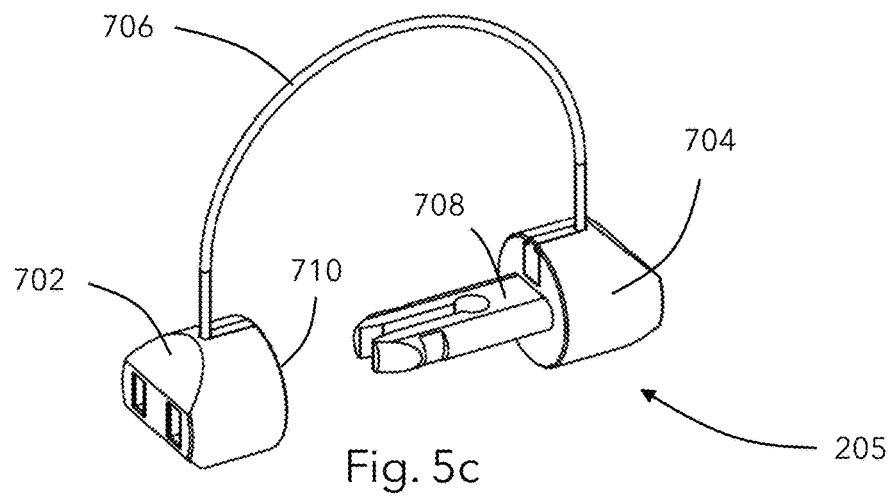
Fig. 5c
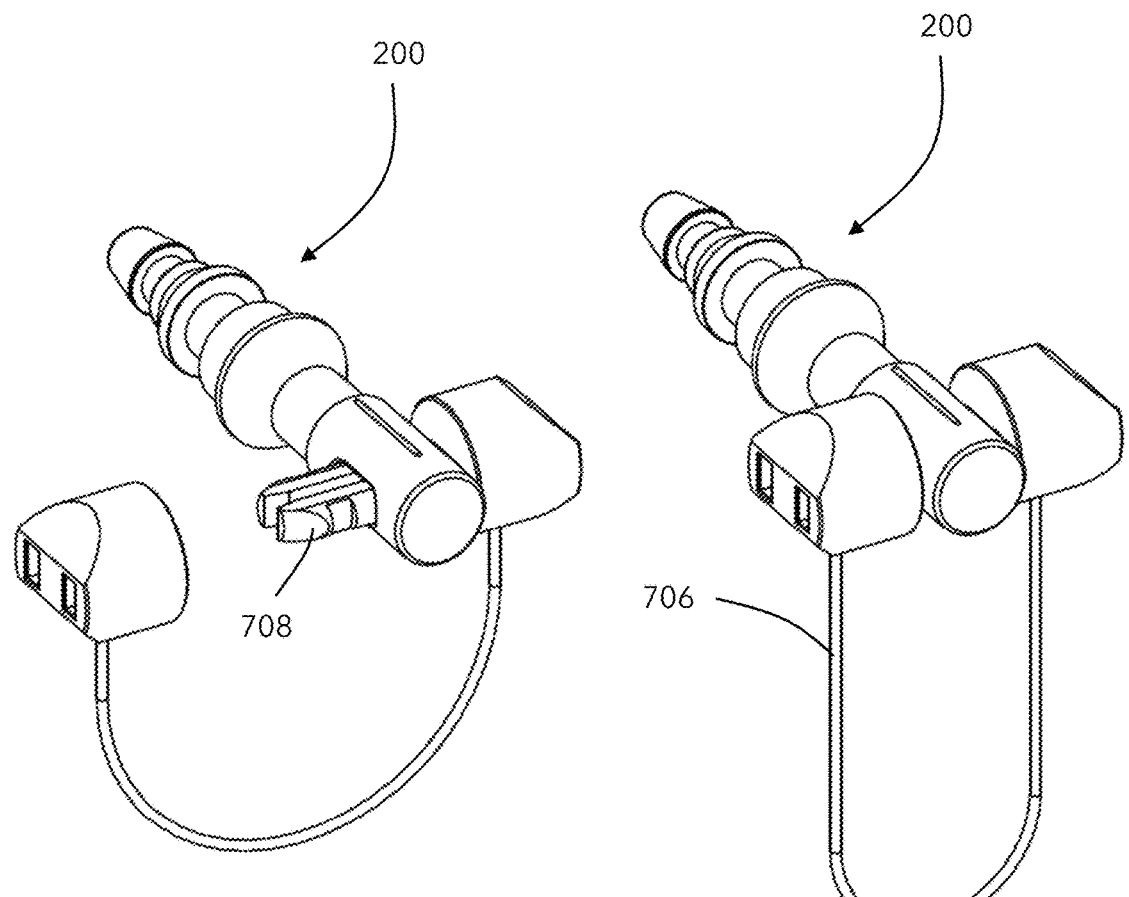
Fig. 5d
Fig. 5e

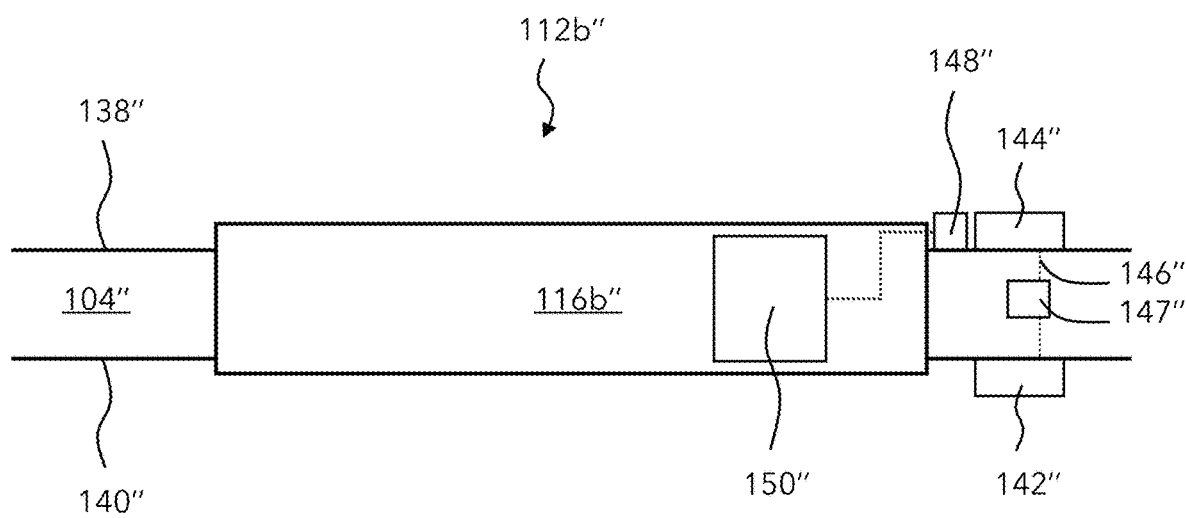
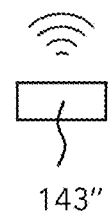
Fig. 11

DOCK DOOR ACCESS APPARATUS

PRIORITY

The present application is related to, and claims the priority benefit of, Great Britain patent application serial no. GB2208784.5, filed Jun. 15, 2022, and Great Britain patent application serial no. GB2115443.0, filed Oct. 27, 2022, the contents of which are incorporated herein directly and by reference in their entirety.

TECHNICAL FIELD

The present invention is concerned with a dock door apparatus. More specifically, the present invention is concerned with an electronically controlled apparatus for controlling access to a dock door of a warehouse.

BACKGROUND ART

Many warehouses feature dock doors. These are large doorways provided in a sidewall of the warehouse and can be opened and closed by means of a dock door actuation apparatus. Dock doors come in several forms, such as rolling or sectional type doors. What they have in common is that they are electronically controlled and electrically actuated to open and close the dock doorway to respectively permit and inhibit the passage of goods to and from a vehicle.

The dock doorways are used for loading and unloading of vehicles, in particular heavy goods vehicles (HGVs) having a tractor unit and trailer defining a load space. HGVs are reversed or docked into position such that the trailer rear door is adjacent the dock doorway. The trailer doors are opened first and then the trailer is docked before the dock doors are then opened allowing goods to be placed into, or removed from, the trailer. Such goods are typically loaded and unloaded via lift trucks (although manual pallet trucks are often used as well). A dock leveller may be provided to ensure a continuous surface between the warehouse floor and trailer floor.

There is increasing pressure on logistics companies to reduce the time taken to unload and load goods vehicles. Having goods vehicles stationary whilst being loaded and unloaded, although unavoidable, is undesirable, and reduction of this 'dead time' to a minimum is paramount.

Unfortunately, this can result in problems. There have been several instances of goods vehicles driving off before being fully loaded or unloaded. This can be a problem as people and loading vehicles (such as lift trucks) rely on a continuous floor surface between the warehouse loading area and vehicle floor. If the vehicle was to depart too early, a drop of over a metre is exposed from the bottom of the dock doorway to the ground. Evidently this is a safety concern.

What is required is a way of preventing the goods vehicle from leaving with the trailer whilst the loading/unloading procedure is underway.

EP3137401 discloses a system and method for automatically controlling a loading dock. A trailer restraint is used to secure the trailer in position adjacent the dock door. The system is used to check for obstructions in an interior area proximate the door. In order to prevent the vehicle from departing during loading, a trailer restraint is provided. In addition, a red light is provided as a signal to the driver. Although this signal is provided to the driver, the system relies on the driver checking the status of the light before driving away. Therefore, the system is vulnerable to human error.

US 2017/0320685 discloses a control system for operation of loading dock equipment. Like EP'401, trailer restraints are suggested as a means for preventing departure of a trailer before loading has been completed. The application is concerned with providing a door panel that is easier to use for the operator. The system provides a control panel having an interactive display screen. Like EP'401, the system relies on a red indicator light to inform the driver that the restraint is engaged and that the vehicle should not be driven away.

US 2019/0144218 (a continuation-in-part of US'685) discloses a system in which functionality is limited by the authorization level of the user. It operates in the same way as US'685.

WO 2020/115085 discloses a system in which a workflow is established for the control of a dock door, and in order to deviate from this workflow an authorization request is submitted. Its primary aim is to reduce the workload for the supervisor responsible for monitoring workflows.

Although the above prior art seeks to solve several problems with dock door systems, none properly tackle the problem of the driver attempting to depart before the vehicle is ready to do so. Even if restraints are used, there is a still risk involved because attempting to drive a restrained vehicle away would likely cause significant damage to the vehicle itself.

What is required is an improved way of ensuring that vehicles cannot depart until it is safe for them to do so. In certain situations, the system also needs to be able to operate with 'drop loads' in which the trailer is deposited at the dock door, and the tractor unit moves away.

It is an aim of the present invention to fulfil that need.

SUMMARY OF INVENTION

According to a first aspect of the present invention there is provided a warehouse dock door control system comprising:
a system controller; and,
an interior side unit configured to open and close a dock door;
wherein:
the system controller is configured to:
receive a signal confirming that a trailer is securely located within a bay adjacent a dock door and, in response, communicate with the interior side unit to authorise opening of the dock door; and,
receive a signal confirming that unloading and/or loading is complete and that the dock door is closed, and, in response, communicate with the exterior side unit to authorise movement of the trailer away from the dock door.

Advantageously, the present invention provides a system which prevents unauthorised removal of the vehicle during a loading/unloading process.

In one embodiment, the system comprises an exterior side unit comprising a physical token receptacle having a physical token detector configured to detect and identify a specific physical token, the physical token having unique identification data associated therewith;
wherein:

the physical token detector is configured to sense the presence of the physical token within the physical token receptacle and to read the identification data associated therewith;

the controller is configured to use the identification data to determine whether the physical token is an authorised physical token;

in response to the determination, communicate with the interior side unit to authorise opening of the dock door.

Preferably, the system controller is configured to control the exterior side unit to secure the physical token in the physical token receptacle to inhibit removal therefrom until a signal is received indicating that a loading or unloading process is complete.

In one embodiment, the physical token is a vehicle key, or a token connected to a vehicle key.

Preferably the exterior side unit comprises at least one fob receptacle configured to receive a fob (which may or may not be attached to a vehicle key). Preferably the fob receptacle comprises a fob detector configured to detect the presence of a fob in the receptacle. Preferably the fob detector comprises an RF component reader, which RFID component reader is configured to read the unique identification data from an RFID component associated with a fob, and to transmit the unique identification data to the controller.

Preferably the fob detector comprises:
an RF coil arranged to emit a carrier signal and receive the modulated carrier signal emitted by an RF component;
wherein the identification data is determined based on modulation of the carrier signal.

Preferably the system comprises:
a plurality of fob receptacles and a plurality of respective RF coils, wherein each coil is arranged to emit a carrier signal and receive the modulated carrier signal emitted by the RF component;
a processor in communication with each of the plurality of RF coils, wherein the processor is configured to poll the plurality of RF coils by selectively allowing current to flow through one or more of the plurality of RF coils at a time and identify the RF component based on modulation of the carrier signal.

Preferably the processor is further configured to determine the distance between the RF component and the one of the RF coils based on the peak amplitude of the modulated carrier signal.

Preferably the system has a fob lock configured to selectively retain the fob within the receptacle to secure the key in the key repository.

In an alternative embodiment, the system comprises a wireless key reader configured to read unique identification data from a key.

Preferably the system comprises a wireless key reader configured to read unique vehicle operation transponder data from a key.

Preferably the key detection system comprises at least one of a weight sensor and a capacitive sensor.

Preferably the capacitive sensor is provided on a sloped surface directly below the key fob receptacle.

Preferably the key detection system comprises a key detection apparatus that detects a key on the basis of an interrupted beam.

Preferably the key detection apparatus comprises:
a plurality of emitters configured to emit light;
a plurality of detectors configured to detect light;
the emitters and detectors arranged such that the light to be detected crosses a detection space;

a controller configured to detect the presence of a key in the detection space by using each of the plurality of detectors to detect light emitted by at least two of the plurality of emitters.

By "detection space" we mean either a volume (a three-dimensional space) or a plane (a two-dimensional space).

Advantageously, using the detectors to detect the light from multiple emitters allows the detection space to be covered more comprehensively for irregular shaped objects which may otherwise escape detection.

Further, because perfect alignment of the emitters and receivers is not required, such systems installation is made more straightforward in retrofit situations. For example, if the system needs to be installed in an existing detection space, it can be provided in two parts with the transmitter strip and receiver strip being separate. The lack of a requirement for perfect alignment means that installation is made much easier.

Preferably each emitter and detector is part of more than one emitter/detector pair, and wherein the controller cycles through emitter/detector pairs to determine the presence of a key in the detection space.

Preferably the controller is configured to cycle through at least two of the plurality of emitters whilst monitoring one of the plurality of detectors.

Preferably the controller is configured to cycle through at least two of the plurality of detectors whilst monitoring one of the plurality of emitters.

Preferably the emitters and detectors each have an optical axis, wherein the emitters and detectors are arranged such that their optical axes are parallel and offset.

Preferably the plurality of detectors are mounted on a first member on a first side of the detection space, and the plurality of emitters are mounted on a second member on a second side of the detection space.

Preferably the first member and the second member are flat and parallel.

Preferably the distance between each detector and at least two closest emitters is the same.

Preferably the emitters and detectors are arranged in a grid pattern viewed normal to the first and second members.

Preferably there is a third member positioned on the opposite side of the second member to the first member, wherein a further detection space is defined between the second member and the third member, and wherein a further plurality of emitters is located on the second member, and a further plurality of detectors is located on the third member, and the controller is configured to detect the presence of a key in the further detection space by using each of the further plurality of detectors to detect light emitted by at least two of the further plurality of emitters.

Preferably the controller is configured to detect the presence of a key in the detection space by using each of the plurality of detectors to detect light emitted by adjacent emitters of the plurality of emitters.

Preferably the key detection system comprises a camera.

Preferably the camera is linked to an image processing computer comprising software configured to identify the presence of a vehicle key.

Preferably there is provided:
a vehicle identification system;
a database of vehicles or vehicle types linked to keys;
wherein the software is configured to identify the key and to verify that the key corresponds to the vehicle in the bay adjacent the dock door.

Preferably the vehicle identification system comprises a registration plate recognition system.

Preferably the vehicle registration is matched to a vehicle model, and in which the key corresponding to the vehicle model is looked up in the database to verify the key.

Preferably the key repository comprises a closure with an electronically controlled lock.

Preferably the exterior side unit comprising a key detector configured to detect and identify a specific site key having unique identification data associated therewith;

wherein:
the key detector is configured to detect the presence of the key within the key repository and to read the identification data associated therewith;
the controller is configured to use the identification data to determine whether the site key is an authorised site key;
in response to the determination, communicate with the interior side unit to authorise opening of the dock door;
wherein the system controller is configured to control the exterior side unit to secure the site key in the key repository to inhibit removal therefrom until a signal is received indicating that a loading or unloading process is complete.

Preferably the interior side unit comprises a visual and/or audible output to indicate that opening of the dock door is permitted.

Preferably the system comprises an interface with a door controller, wherein the system is configured to electronically inhibit opening of the dock door unless authorised.

Preferably wherein the controller is programmed with a system control procedure programme, the system control procedure programme comprising a plurality of logic steps for operation of the system, and wherein the system control procedure programme is updateable to modify the plurality of logic steps for operation of the system.

Preferably the controller is configured to determine durations for all loading and unloading procedures.

Preferably the controller has a connection to cloud storage to provide system data for data analytics.

Preferably the controller stores a predetermined time or range of times for loading/unloading procedures and is configured to trigger and output if the current loading procedure does not fall within the predetermined time or range of times.

Preferably the predetermined time or range of times is based on an average of like systems across a site or plurality of sites.

In an alternative embodiment, the controller may be configured to receive and identify an electronic token, the electronic token having unique identification data associated therewith;

wherein:
the controller is configured to use the identification data to determine whether the electronic token is an authorised electronic token;
in response to the determination, communicate with the interior side unit to authorise opening of the dock door.

The electronic token may be carried wirelessly to the controller, for example by WiFi™, Bluetooth™ or another method of wireless data transmission. The electronic token may be received by an exterior unit and transmitted to the controller, or alternatively may be communicated directly to the controller which may be integrated with the interior side unit.

According to a second aspect there is provided an electronic fob for an access and authorisation system, the fob comprising:
a wireless data tag comprising data identifying the fob;
a first fob part for insertion and retention within a fob receptacle;
a hook defining an openable loop for the attachment of an item;
wherein the loop has a closed condition and an open condition; and,
wherein when inserted into a receptacle, the loop cannot be moved to the open condition.

Preferably the loop is moved from the closed condition to the open condition by axial movement of a second loop part relative to a first loop part, wherein when inserted into the receptacle, the second loop part cannot be moved relative to the first loop part.

Preferably the second loop part is connected to an axially moveable sleeve, and wherein movement of the sleeve is restricted by abutment with a surface in which the receptacle is formed.

Preferably the fob is resiliently biased to the open condition of the loop.

The fob of the second aspect is useable with the system of the first aspect.

BRIEF DESCRIPTION OF DRAWINGS

An embodiment of the present invention will now be described with reference to the following figures in which:

FIG. 4b is a perspective view of a subassembly of the unit of FIG. 4a;

FIG. 4c is a perspective view of a part of the unit of FIG. 4a;

FIG. 4d is a side view of a part of the unit of FIG. 4a;

FIG. 5b is a section view of the key fob of FIG. 5a;

FIG. 5c is a perspective view of a key-fob seal for use with the key for of FIG. 5a;

FIGS. 5d and 5e are perspective views of the seal of FIG. 5c being assembled with the fob of FIG. 5a;

FIG. 11 is a plan schematic view of a fourth embodiment according to the present invention;

DESCRIPTION OF THE FIRST EMBODIMENT

Referring to FIGS. 1 to 7, the first embodiment of the present invention is shown.

Configuration

Figure 1:
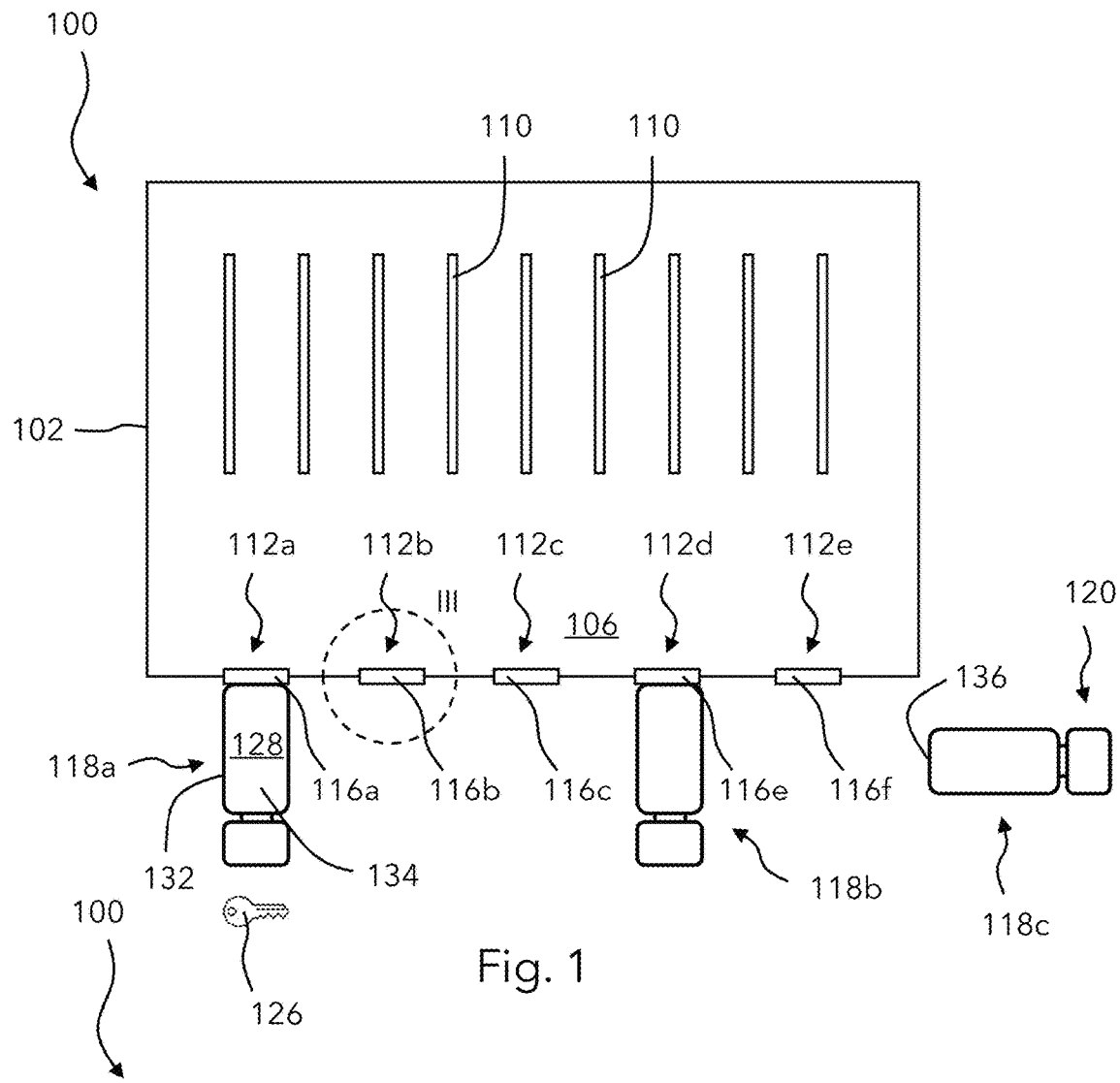
FIG. 1 is a plan view of a warehouse, vehicles and apparatus according to the present invention.
Figure 2:
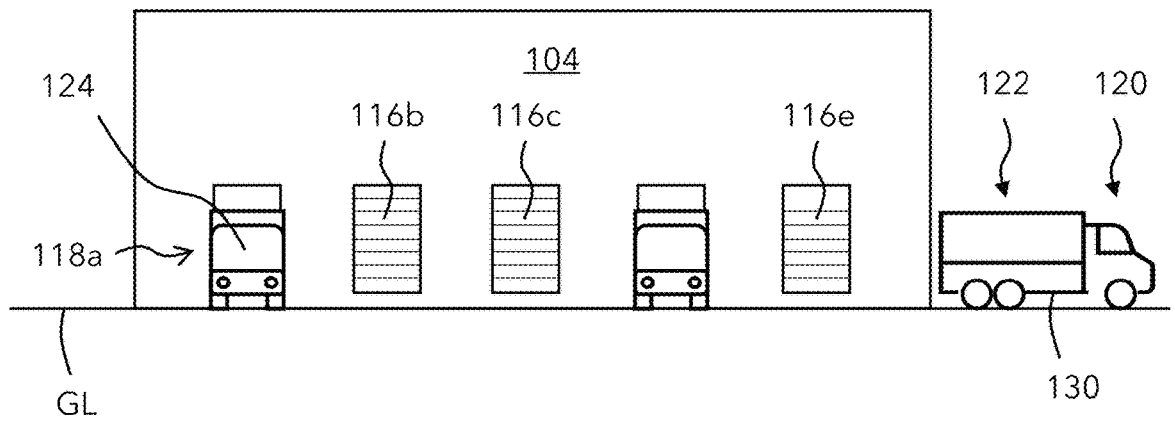
FIG. 2 is a front view of the warehouse, vehicles and apparatus of FIG. 1.

FIGS. 1 and 2 show a storage facility in the form of a warehouse 100 having an outer wall 102, the outer wall having a loading wall 104 adjacent a loading area 106 within the warehouse 100. The outer wall 102 and loading wall 104 partially demarcate the interior from the exterior of the warehouse 100.

The warehouse 100 comprises shelving or racking 110 for storage of goods, equipment or other physical items to be distributed. The loading wall defines a plurality of apertures formed as dock doorways 112a-112e. The dock doorways are provided in the wall above a ground level GL to enable their lower edges to sit adjacent the floor of a vehicle trailer. The dock doorways are provided adjacent the loading area 106, in which items are positioned for loading through the doorways 112a-112e.

Each doorway 112a-112e is provided with a dock door 116a-116e. Each dock door 116a-116e can be moved between a closed condition (e.g., 116b) in which the doorway is sealed, and an open condition (e.g., 116a) in which the doorway is opened. The doors 116a-116e are electrically powered and controlled by a door controller positioned on the inside of the warehouse 100.

FIGS. 1 and 2 show three HGVs 118a-118c. Each HGV comprises a tractor unit 120 and trailer 122. Each tractor unit 120 has a cab 124 in which the driving controls are positioned, including an ignition circuit controlled by a key 126. Each trailer 122 has a load space 128 defined by a trailer floor 130, walls 132 and ceiling 134. At the rear of each trailer 122 there is provided a trailer door 136 which is moveable between an open and closed condition as is known in the art.

Not all trailers 122 have an associated tractor unit. Some may be dropped off by a shunter and therefore be a 'dropped trailer' rather than a 'live load'.

The tractor units 120 each comprise a power source (e.g., an IC engine or battery) and a powertrain for transmitting power to the wheels. The presence of the key 126 in the cab 124 is necessary to move the vehicle. For example, the key 126 may be a mechanical-type key requiring physical insertion into an ignition drum. Alternatively, the key may be electronic and its presence confirmed by wireless communication. They key may be dedicated for this purpose, or may take the form of e.g., a smartphone or other mobile computing device, such as a wearable device. Either way, the term 'key' in this context will be understood to mean an item which is necessarily present in the vehicle cab to enable the vehicle to be driven.

Figure 3:
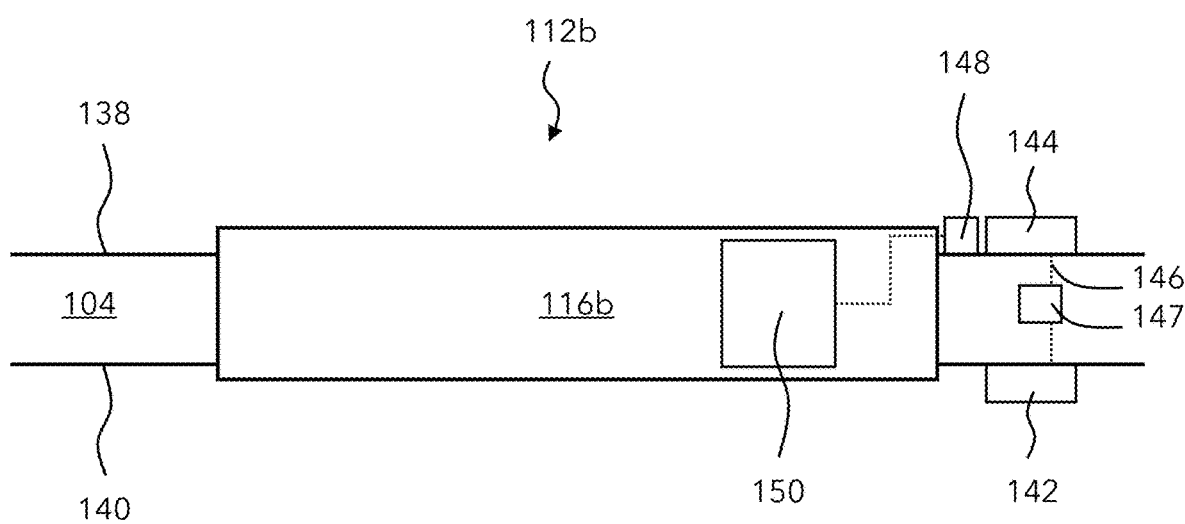
FIG. 3 is a detail view of area III of FIG. 1.

Referring to FIG. 3, the doorway 112b with door 116b is shown in more detail in situ in the dock wall 104 in plan view. For the purposes of the following explanation, the dock wall 104 has an interior surface 138 and an exterior surface 140.

Provided on the exterior of the warehouse 100 there is provided an exterior control unit 142, shown in more detail in FIGS. 4a to 4d. Provided on the interior of the warehouse 100 there is provided an interior control unit 144, shown in more detail in FIG. 6. The units 142, 144 are connected by a data and power link 146, which in this embodiment is hard-wired. A controller 147 is provided which is in communication with the units 142, 144. The exterior control unit 142, interior control unit 144 and controller 147 form a dock door control system 101 according to the invention.

The door control unit 148 is manually controlled and is configured to control a motor 150 to open and close the dock door 116b.

Exterior Control Unit 142

The exterior control unit 142 is shown in FIGS. 4a to 4d. It comprises a wall mounting plate assembly 152 and an enclosure assembly 154.

Figure 4A:
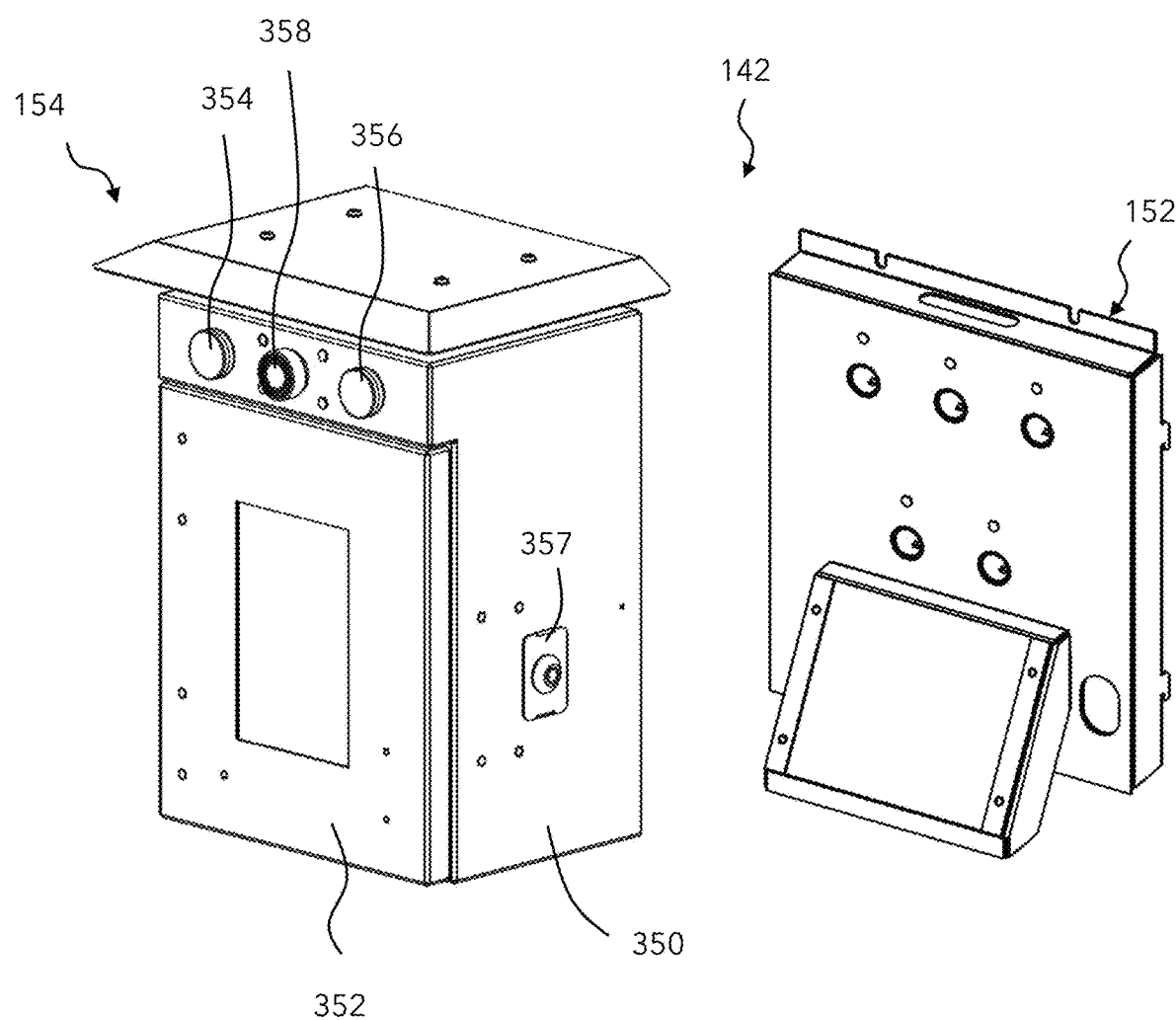
FIG. 4a is an exploded, perspective view of an exterior control unit in accordance with the present invention.
Figure 4B:
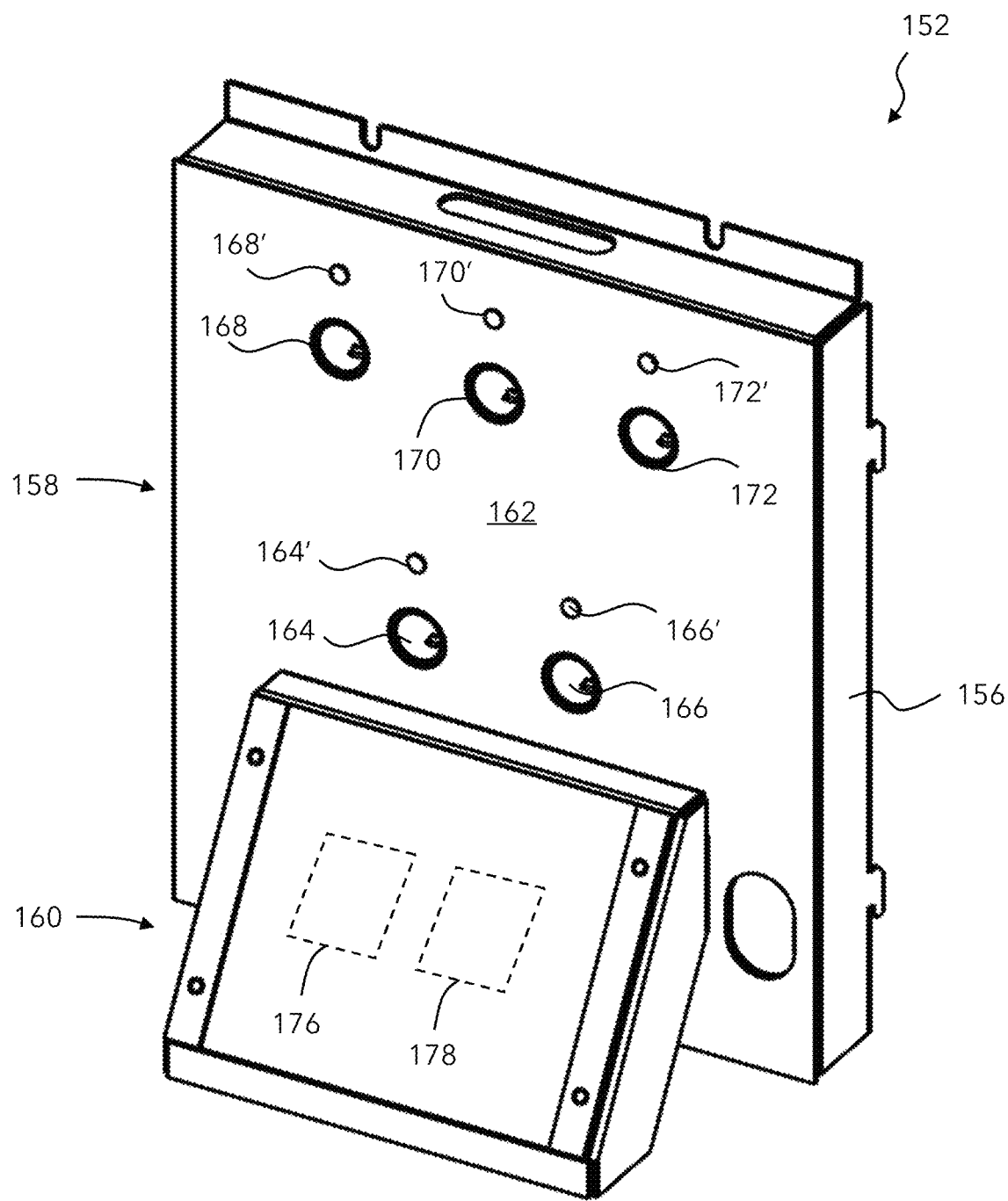

The wall mounting plate assembly 152 is shown in more detail in FIG. 4b. It comprises a backplate 156 for attachment to the wall 104, a fob-receiving sub-assembly 158, and a key presence detection sub-assembly 160.

The fob-receiving sub-assembly 158 comprises a face plate 162 defining a first array of fob receptacles 164, 166, and a second array of fob receptacles 168, 170, 172. Each fob receptacle has an associated indicator light 164'-172'.

The configuration and operation of the fob-receiving sub-assembly 158 is similar to that described in the applicant's previous application WO 2021/130346 "Asset control system", which is incorporated herein by reference (where permitted).

Figure 5A:
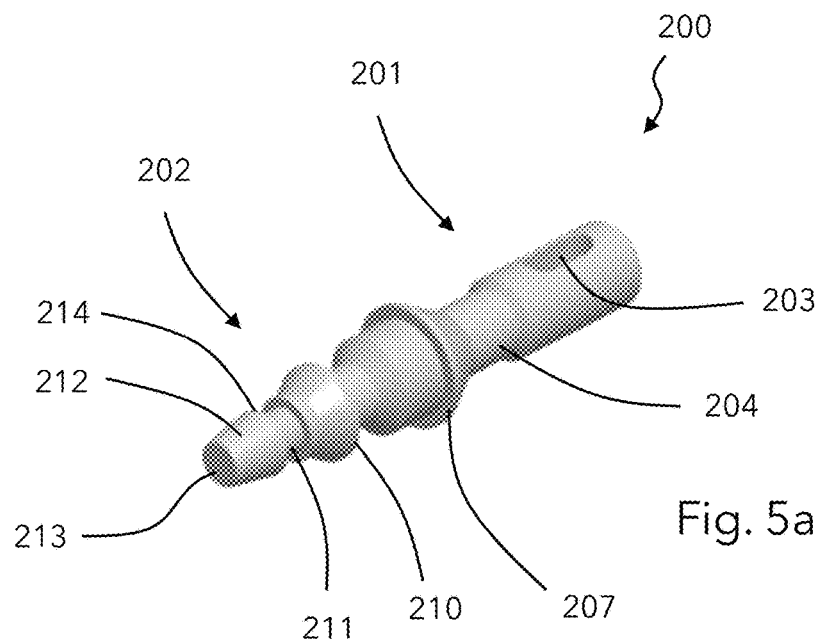
FIG. 5a is a perspective view of a key fob for use with the present invention.
Figure 5B:
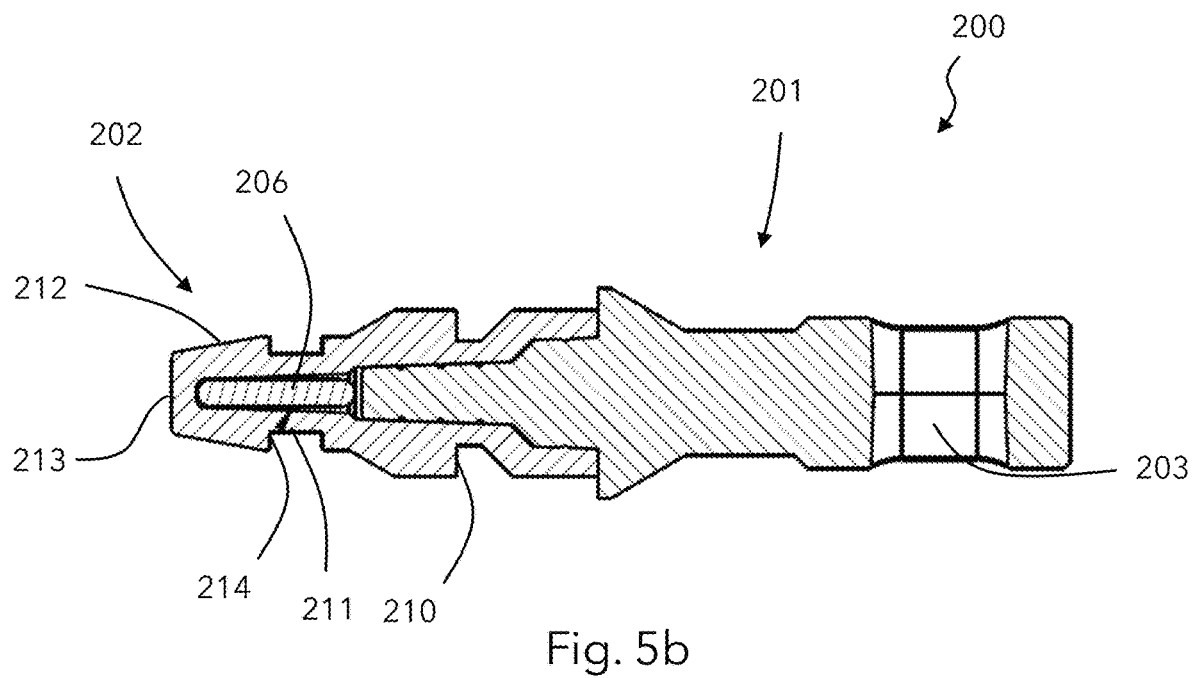

A fob 200 is shown in FIGS. 5a and 5b. Fob 200 comprises main fob component 201 and fob tip component 202, both of which are made of a glass filled plastic, or a durable plastic, such as acetal copolymer. Fob tip component 202 is insertable into the fob receptacles 164, 166 etc. The main fob component 201 comprises an aperture 203 to facilitate attachment to a key via an anti-tamper key ring/seal 205, handle portion 204 and shoulder 207.

The fob tip component 202 is generally hollow and is shaped internally to accommodate the distal portion of the main fob component 201. The fob tip component 202 has a distal end 213, tapered end portion 212 and a neck portion 211. A lip 214 and a lip 210 are relevant for insertion and locking respectively, as will be described below.

An RFID component 206 is inserted into the end of fob tip component 202. The RFID component 206 comprises an antenna and an integrated circuit for uniquely identifying the particular component (and therefore fob 200), as is known in the art. In this embodiment, the RFID component 206 is passive.

The seal 205 comprises a first mating part 702, a second mating part 704 and a lanyard 706 joining the two. The second part 704 has a male member 708 that engages a female socket 710 on the first part 702 to clamp the fob 200 as shown in FIGS. 5d and 5e. Specifically, the male member 708 passes through the aperture 203 before engaging the first part 702. The male and female formations snap fit together and can only be undone with a special tool. It will be noted that in use, the lanyard is fed through a loop on the vehicle key to securely fasten the key to the fob.

Figure 4C:
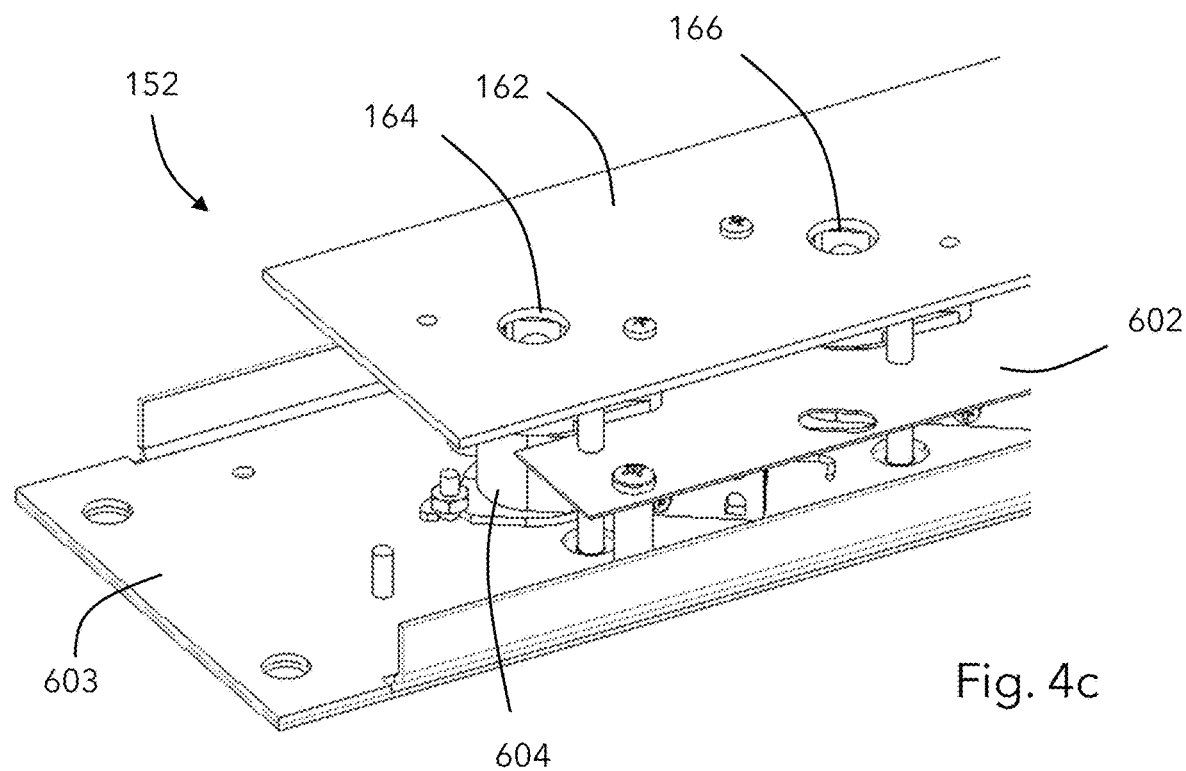
Figure 4D:
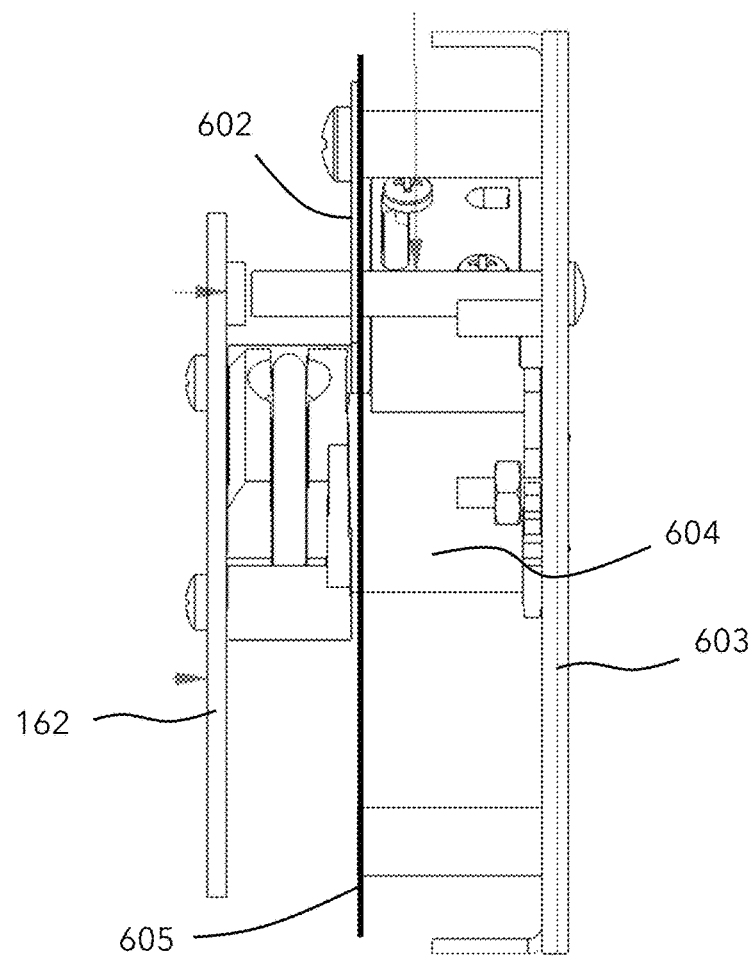

The inner components of the mounting plate assembly 152 are shown in more detail in FIGS. 4c and 4d.

The assembly comprises the face panel 162, an intermediate panel 602 and an internal panel 603.

A printed circuit board (PCB) 605 (only visible in FIG. 4d) is located on the rear side of the intermediate panel 602

A fob receptacle unit 604 is provided in communication with the receptable 164 (and similarly, each other receptacle has a unit associated therewith). The fob receptacle unit is configured to receive, and mechanically engage each fob 200 as it is inserted to position it in a desired axial position with respect to the circuit board.

The receptacle unit 604 is also provided with an electronically controlled lock, which is configured to selectively retain the fob 200 within the unit 604 when requested to do so by a controller. Locking occurs by radially advancing a locking member into engagement with the fob outer perimeter—specifically the lip 210. The locking member is controlled by e.g., a solenoid per WO 2021/130346.

Each receptable 164, 166 etc has a corresponding port defined in the PCB 605 which in turn has a corresponding RF receiver coil encircling it. A PCB microcontroller has a Peripheral Pin Select (PPS) function which allows each pin port to be configured as an input or output. A 125 KHz signal from an internal timer in the microcontroller is configured to input to the pin ports in parallel. The pin ports are switched to be outputs, one at a time in sequence, and the pin port that is an output forces a 125 KHz current through its corresponding coil. No current flows through the other coils at this time because the other pin ports are inputs. As a fob 200 approaches a receptacle (e.g. 164) and comes into the range of a signal transmitted by the RF transceiver coils, the RFID component 206 in the fob is able to transmit a signal back to the RF transceiver coils, as is known in the art of passive RF systems. The RFID component 206 in the fob will modulate the signal to incorporate the fob's unique identifier, such that modulation of the coil carrier signal by the RFID component uniquely identifies fob 200, and therefore the key that fob 200 is attached to. Due to the relatively close proximity of the fob with the coil, the current required to elicit a signal from the fob can be achieved by the pin ports, without requiring extra driver circuits.

The modulated current in the coils (due to the fob's modulated signal) results in a modulated voltage. The voltage signal amplitude will be dependent upon the proximity of the fob to the coils; the closer the fob is to the coils, the greater the amplitude. The modulated voltage is passed through a peak detector and filter to remove the 125 KHz carrier as well as low frequency interference. The filtered signal is then fed back to microcontroller which measures the peak-to-peak level of the signal to determine the amplitude. The signal strength/amplitude is used to determine the distance of the fob relative to the coil. The filtered signal is also passed through a zero-crossing detector which converts the signal to logic levels before sending the signal back to microcontroller for decoding. In an alternative embodiment, microcontroller is able to extract the required data without the need for a zero-crossing detector.

Accordingly, it will be appreciated that it is not the RF field strength that is being measured by the processor, but the amplitude of the modulated voltage signal in the coils. The extent of the modulation which will vary according to the extent of 'absorption' of the emitted RF signal from the coils by the fob; the signal emitted by the fob will have a different clock cycle to the signal received by the fob. This data allows the processor to identify the fob.

The number of coils (which is the same for each layer) chosen is based on a compromise between increasing field strength and printing the coils so that there are no, or limited reception issues. It has been found that around 50 to 60 turns on each RF receiver coil allows each pin port to output a signal strong enough to activate an RFID chip in a fob. The coil turns are printed on both sides of a PCB. However, since the cost of a PCB is dependent on the track width and spacing, 4-layer PCB technology is utilised, such that the turns are spread over 4 layers.

The smaller the outside diameter of the coil, the faster the received signal drops with fob distance from the coil. The inner coil diameter is therefore as small as possible and is limited by (and is ideally equal to) the width of the pin port. The outer coil diameter is also preferably as small as possible so as to limit curvature of the field emanating from the coils. In a preferred embodiment, the diameter of the outer coil is between 1.2 cm and 3 cm. When the diameters of the inner and outer coils are as small as possible, the emitting field shape is optimised for accurate distance determination, such that the amplitude of the current in the coils from RFID component 206 varies significantly over a small distance range. This enables an accurate absolute or relative distance determination.

Accordingly, the present invention utilises a single processor for the sequential operation of multiple RF coils, which are all printed onto a single PCB.

This distance accuracy is a departure from existing passive RFID systems and results from the arrangement of the RF transceiver coils, as discussed above. Accordingly, the processor, in conjunction with a fob management software application, is able to determine the distance of fob 200 from fob receptacle (again, based on calibration data) and, more specifically, determine how far fob 200 is inserted into receptacle 164. Optimally, the highest voltage signal amplitude in the relevant coil is measured when fob 200 is fully inserted into receptacle 164. Based on the determination of peak amplitude, the fob management application can determine that a fob is fully inserted and therefore if it is mechanically locked in position. The system is also configured to detect attempted key tamper by unauthorised movement of the fob, detected by the above method.

In this way, the fob management application is also able to determine the extent to which fob resides in receptacle 164 and control the receptacle unit lock accordingly. In particular, this allows the fob management application to determine whether slight movement of fob within receptacle, even when authorisation to remove a key has not been granted and the solenoid pin has not been released/energised.

Each of the fob indicator lights 164'-172' is also controlled by the controller.

The key presence detection sub-assembly 160 comprises a rest plate 174 which is positioned below the receptacles 164, 166 and at an angle thereto, sloping downwardly away from the plate 162. The sub-assembly 160 comprises a pair of key detectors 176, 178. Each detector 176, 178 comprises a capacitive sensor configured to detect the presence of ferromagnetic materials on the sloped rest plate 174—specifically vehicle keys. The slope of the plate 174 means that a metal object cannot simply be positioned on it to fool the system—it would slide off. The object detected is necessarily attached to a fob inserted into the receptacles 164, 166. The system is configured such that the key must be detected within a set time window (e.g., 2 seconds) of the key fob being inserted into the receiving slot.

The enclosure assembly 154 acts as a lockable key repository and comprises a secure box 350 with an electronically lockable access door 352, first indicator 354, second indicator 356 and button 358. The door 352 can be unlocked by the system, and with a site supervisor door access fob which can be detected by a sensor 357.

Interior Control Unit 144

Figure 6:
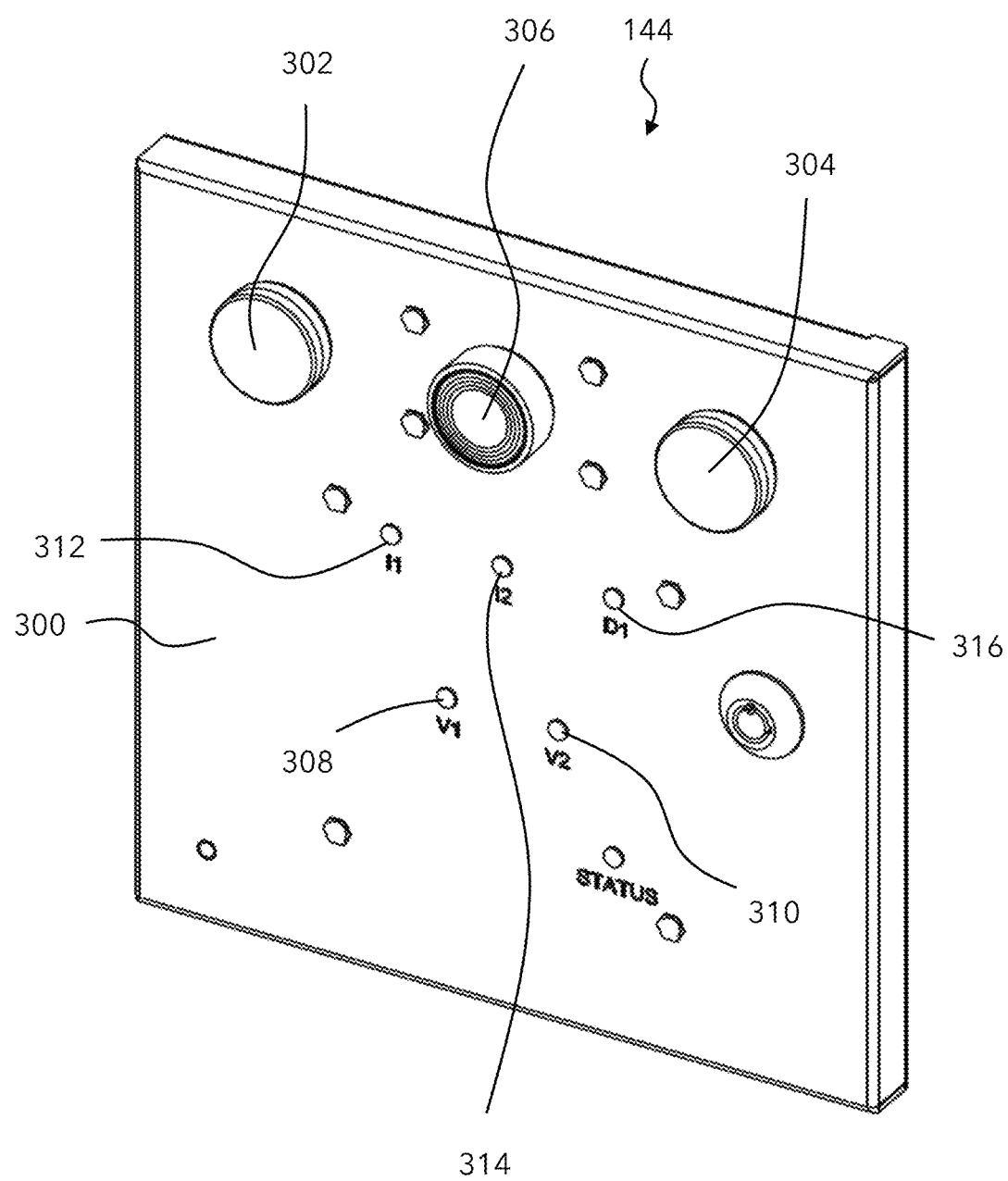
FIG. 6 is a perspective view of an interior control unit in accordance with the present invention.

Referring to FIG. 6, the interior control unit 144 comprises a face plate 300 on which there is provided a first (red) indicator light 302, a second (green) indicator light 304, a button 306, and a plurality of fob indicator lights 308-316.

The button 306 is configured to provide an input to the controller 147 (as will be described below). The fob indicator lights 308-316 are configured to mirror the fob indicator lights 164'-172' respectively on the external unit.

Controller 147

The controller 147 is depicted as a unit separate to the units 142, 144 in FIG. 3, but it will be noted that it may be positioned within either unit 142, 144. The controller 147 comprises a PCB having a processer, memory and I/O ports to communicate with both the units 142, 144 to receive and send data and power signals. The controller 147 also comprises an internet connection (which may be provided via a wired connection, or a wireless (Wi-Fi, cellular) connection as desired), although it will be noted that the primary functionality described below can take place without such connectivity. Therefore, operation is not dependent on that connection. The controller has appropriate software stored thereon, the functionality of which will be described below.

The controller is configured to control the system logic depending on the safety systems and requirements on-site. It is envisaged that different sites may have different requirements and processes which need to be adhered to. Requirements and processes may change over time. Therefore, the controller 147 can be remotely updated as these systems change and evolve.

The controller 147 comprises and manages a database and is fundamentally configured to check whether a fob (or a vehicle key if the system is implemented using RFID keys) is permitted on that site and may be stored in that specific key box. This provides the user with specific and granular control and prevents any unauthorised fob from being inserted into a dock door key box facilitating dock door operation.

Further to this, the controller is configured to record times and calculate durations for all transactions and using IoT data communication services, connect these edge devices to cloud storage for data analytics. The controller can also trigger outputs should loads take too long (target times can be set online or locally through a connected mobile device such as a PC or smartphone via ad-hoc Wi-Fi or ethernet), whether connected to the internet or not. If connected, data analytics can be managed and the system auto-updates on an average loading time basis so therefore output to an external warning alert light should the loading be taking more than the average over a set duration i.e. a month. across that site or multiple sites on the same network of connected like systems.

System Setup

The system is set up such that each vehicle's ignition key ("vehicle keys") 126 is attached to a key fob 200. Optionally, site keys necessary for locks and other such equipment to retain the vehicle and/or trailer in position ("site keys") can be attached to a fob 200. In one embodiment, the fob and the key may be the same device.

The system, and more specifically the controller 147 is programmed with the identities of each fob 200, and more specifically to which key they are attached. This information is stored in local memory, but it will be noted that the controller could also be connected to the internet, and as such can have its local database updated and modified as required (for example to add/remove vehicles for that particular site).

Figure 7:
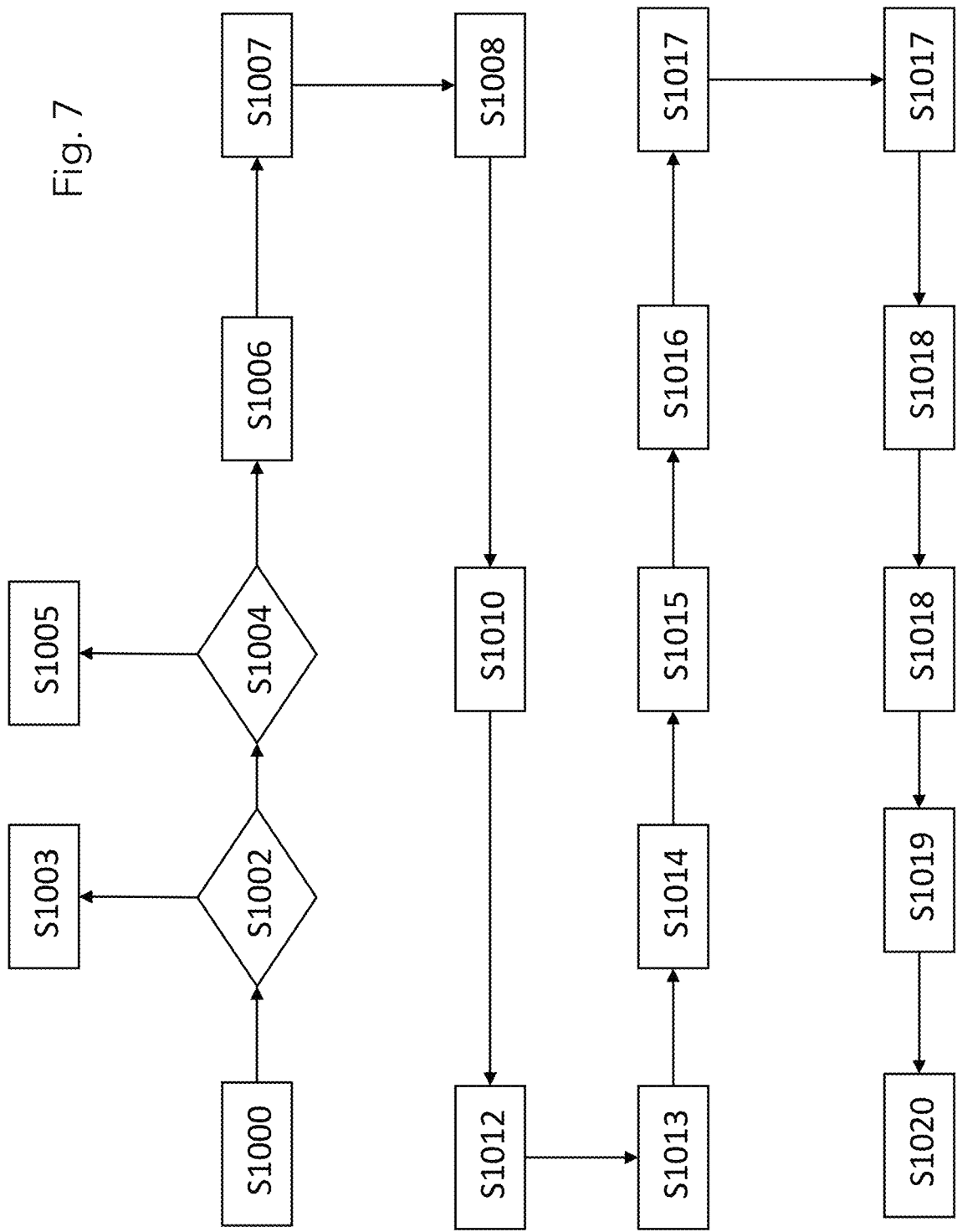
FIG. 7 is a process diagram for implementation with the first embodiment of the present invention.

Turning to FIG. 7, side by side views of modified units 1142 and 1144 (based on 142 and 144 respectively) are shown. It can be seen that the layout of the exterior unit 1142 is mirrored in the interior unit 1144.

Use

Referring to FIG. 7, the algorithm described herein is stored on the memory of the controller 147, and is merely an example of the type of process that the system can accept. The algorithm is based on a typical, standard industry workflow, and that workflow's implementation using a system according to the present invention:

At step S1000 a vehicle 118a arrives on-site and is instructed to back up to a dock door 112a. The driver manoeuvres the vehicle 118a into position and turns the engine off. He passes the vehicle key with attached fob to the on-duty site marshall. At this stage the key box is empty and shut.

At step S1002 the marshall (or the driver) presses a button on the exterior unit 142 to open the door 352. inserts the fob into the receptacle 164. If the fob is not authorised, not recognised or placed in the incorrect receptacle, the system proceeds to step S1003 where the relevant indicator light 164'-172' (and the corresponding light 308-316 on the interior unit 144) is lit red. The light 356 is lit red to show the exterior manager that loading is not authorised, If the correct key is inserted (the fob identity is checked against the controller's database) the system moves to S1004.

At step S1004, the key detection sensors 176, 178 are polled to determine whether the inserted vehicle fob(s) have a key attached. If not, step S1005 is initiated in which the relevant indicator light 164'-172' (and the corresponding light 308-316 on the interior unit 144) is lit red.

At step S1006, a vehicle key receptacle (164 or 166) has a vehicle key fob inserted and a key is detected. The indicator light 164' (or 166') is lit green. The light 356 remains lit red in this embodiment to show the exterior manager that loading is still not authorised (a site key is expected).

At step S1007, a site key is inserted into receptacle 168. The site key fob is checked to determine whether it is authorised, and if so then the indicator lights 168', 312 are also lit green.

At step S1008, once the enclosure is secured, the system is ready for loading. The light 356 is deactivated and the green light 354 is activated to show the exterior user that the system is ready for loading. At this point the green light 302 on the interior is lit to show the interior side marshall that the dock door may be opened. The marshall operates the control 148 to do so. The door is opened at step S1010. The door status as "open" is received by the controller 147. Red lights 356, 304 are both lit.

Once loading is complete, the supervisor closes the dock door (via control 148) and once closed, the controller receives a "door closed" signal at step S1013. At step S1014, key collection is initiated, and the exterior side green light 354 is activated (red light 356 is turned off).

At step S1015, the exterior manager observes the green light 356 and uses his site supervisor door access fob to unlock the door 352. The interior red light 304 is lit.

At step S1016 the door is opened and the unit 154 releases the site key. This is indicated to the manager by illumination of the indicator light 168'. The site key is removed (which is verified by the unit 152) and the door 352 closed. The manager then unlocks the necessary site equipment.

The driver can then press the button 358 on the unit 154 to open the door at step S1017. The light 164' adjacent the vehicle key is illuminated, and the unit 158 unlocks the driver fob at step S1018. The key is removed, and the door closed at step S1019. The system is idle at step S1019 and the vehicle is able to leave the site at step S1020.

As discussed above, the system can be configured to accommodate 'drop trailers' which have no tractor unit. In this instance the key box will expect to receive either an authorised users RFID 'efob' or another signal to confirm that it is safe outside for the dock door to raise i.e. a site key locking another safety system such as a stop sign, jack stand or suzie lock. As an alternative, other electronic measures may be provided which have input feeds into the controller to confirm the load is secure such as a combilock or other safety system that can deliver an appropriate electronic signal. These options are explored further with respect to the fourth and fifth embodiments below.

DESCRIPTION OF THE SECOND EMBODIMENT

Figure 8:
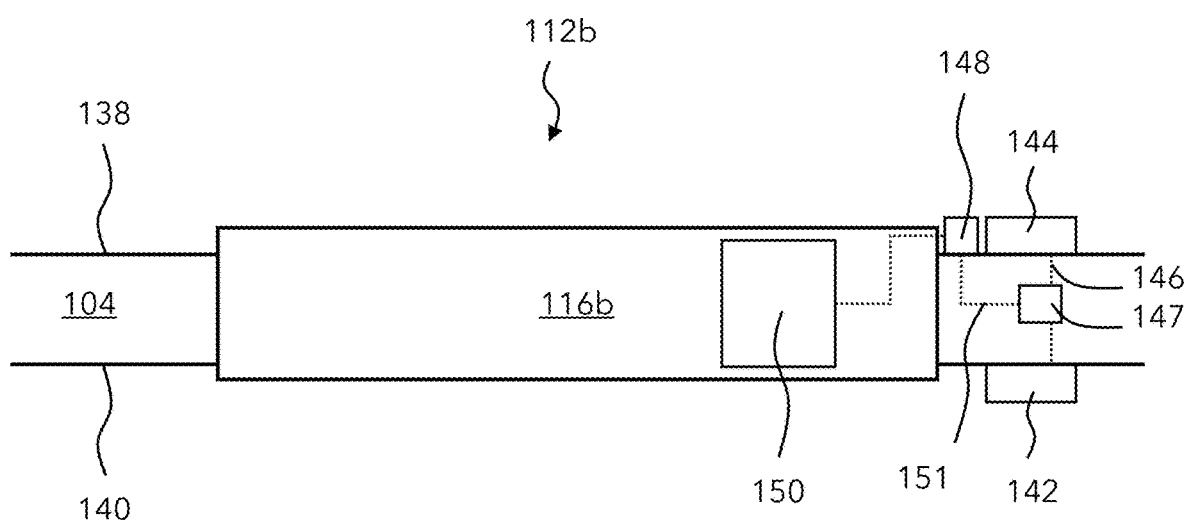
FIG. 8 is a representation of a second embodiment in the form of a modified version of FIG. 3.

Referring to FIG. 8, a further embodiment is shown in which the controller 147 is connected to the door controller 148 by a data link 151 (which may be wired or wireless).

The controller 147 is configured to interrupt the ability of the door control 148 to be activated. The system is interlocked in this way until step S1008 is reached, at which point door control is permitted via link 151.

In a still further embodiment, the door controller 148 may be controlled by the controller 147, in which case door operation occurs automatically at step S1008.

DESCRIPTION OF THE THIRD EMBODIMENT

In a further embodiment of the present invention, it is recognised that the vehicle key may not be available to provide the required interlock to ensure that the trailer will not be moved. For example, where a drop load is utilised the tractor unit leaves the trailer in situ to be unloaded and/or loaded. In this situation, the driver needs to retain the key to operate the tractor unit.

Figure 10:
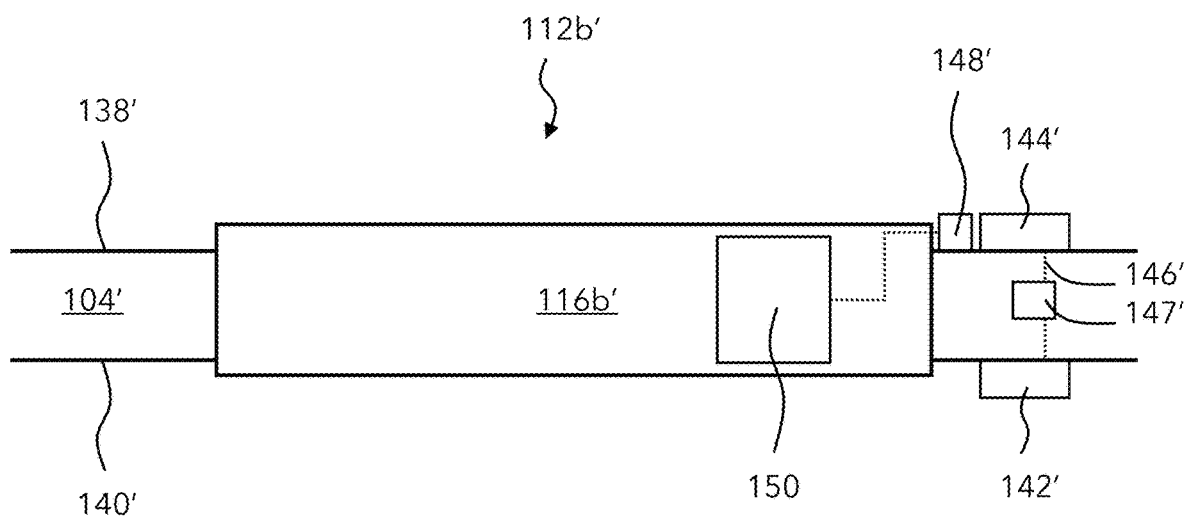
FIG. 10 is a plan schematic view of a third embodiment according to the present invention.

Referring to FIG. 10, a doorway 112b' with a door 116b' is shown in more detail in situ in a dock wall 104' in plan view. For the purposes of the following explanation, the dock wall 104' has an interior surface 138' and an exterior surface 140'.

Provided on the exterior of a warehouse 100' there is provided an exterior control unit 142'. Provided on the interior of the warehouse 100' there is provided an interior control unit 144', similar to that of FIG. 6. The units 142', 144' are connected by a data and power link 146', which in this embodiment is hard-wired. A controller 147' is provided which is in communication with the units 142', 144'. The exterior control unit 142', interior control unit 144' and controller 147' form a dock door control system 101' according to the invention.

The door control unit 148' is manually controlled and is configured to control a motor 150' to open and close the dock door 116b'.

Exterior Control Unit 142'

Unlike the first embodiment, the exterior control unit 142' is not required to receive a vehicle key. Instead, it is configured to receive, and to confirm the continued presence of at least one of the following physical tokens:
  a fob having an addressable RFID tag, for example the fob 200;
  a keycard storing an ID;
  a trailer lock key;
or any combination thereof. For example, a trailer lock key may be attached to a fob and secured and detected in the same way as a vehicle key. The presence of these tokens is first and foremost confirmation that the trailer is in situ and will not be moved.

For example, in one embodiment the trailer may be secured by a physical locking mechanism that can only be unlocked by a key. The presence of that key in the exterior control unit 142' means that the trailer cannot be removed, and as such the controller 147' can authorise unloading and/or loading.

In another embodiment, a keycard may be deposited by a site manager or other authorised person who is also responsible for which trailers may, or may not, be moved.

DESCRIPTION OF THE FOURTH EMBODIMENT

As with the fourth embodiment, the fifth embodiment may be used with systems in which a drop load is envisaged.

Referring to FIG. 11, a doorway 112b" with a door 116b" is shown in more detail in situ in a dock wall 104" in plan view. For the purposes of the following explanation, the dock wall 104" has an interior surface 138" and an exterior surface 140".

Provided on the exterior of a warehouse 100" there is provided an exterior control unit 142". Provided on the interior of the warehouse 100" there is provided an interior control unit 144", similar to that of FIG. 6. The units 142", 144" are connected by a data and power link 146", which in this embodiment is hard-wired. A controller 147" is provided which is in communication with the units 142", 144". The exterior control unit 142", interior control unit 144" and controller 147" form a dock door control system 101" according to the invention.

The door control unit 148" is manually controlled and is configured to control a motor 150" to open and close the dock door 116b".

Exterior Control Unit 142"

Unlike the fourth embodiment, the exterior control unit 142" is not required to receive a physical token. Instead, a transmitter 143" is provided. The transmitter 143" is configured to send signals to the exterior control unit 142" to indicate that a trailer is secured. Upon receipt of that signal, the controller 147" instructs the interior control unit 144" that it may permit opening and closing of the dock door 116b".

The transmitter 143" may be one or more of the following:
  a mobile device such as a mobile telephone, tablet or PDA carried by an external supervisor with responsibility for confirming that the drop load is secured;
  a transmitter connected to a lock or other device configured to inhibit removal of the trailer from the bay;
  a transmitter connected to a device configured to determine whether the trailer is connected to a tractor unit;
or any combination thereof. The transmitter essentially sends an electronic token (in the form of an authorisation code) to the unit 142". The presence of these tokens is first and foremost confirmation that the trailer is in situ and will not be moved.

In an alternative embodiment, the transmitter may communicate directly with the controller 147" or even the interior side unit 144" with an integrated controller.

DESCRIPTION OF THE FIFTH EMBODIMENT

Figure 12:
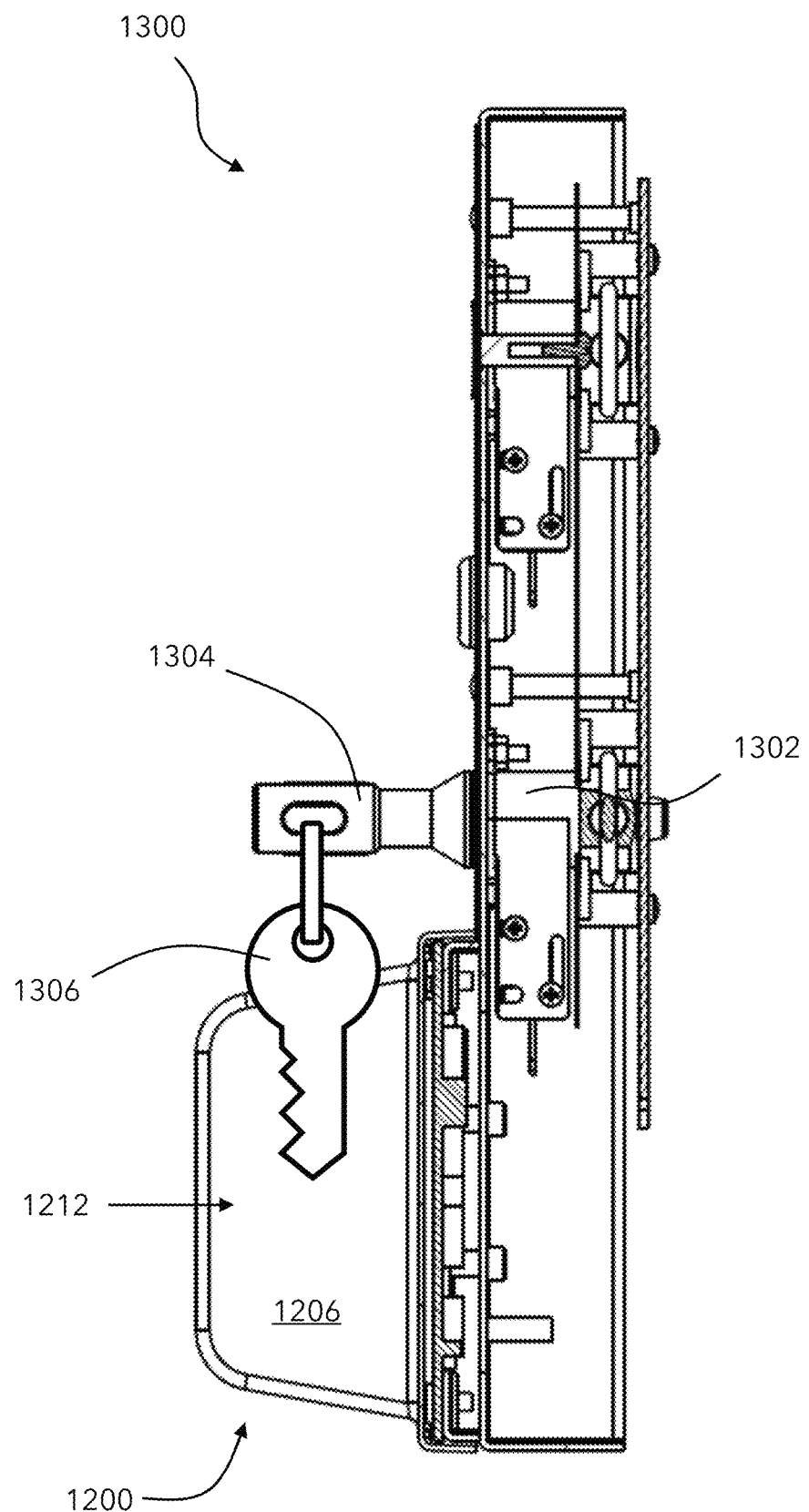
FIG. 12 is a detail side section view of part of a fifth embodiment according to the present invention
Figure 13:
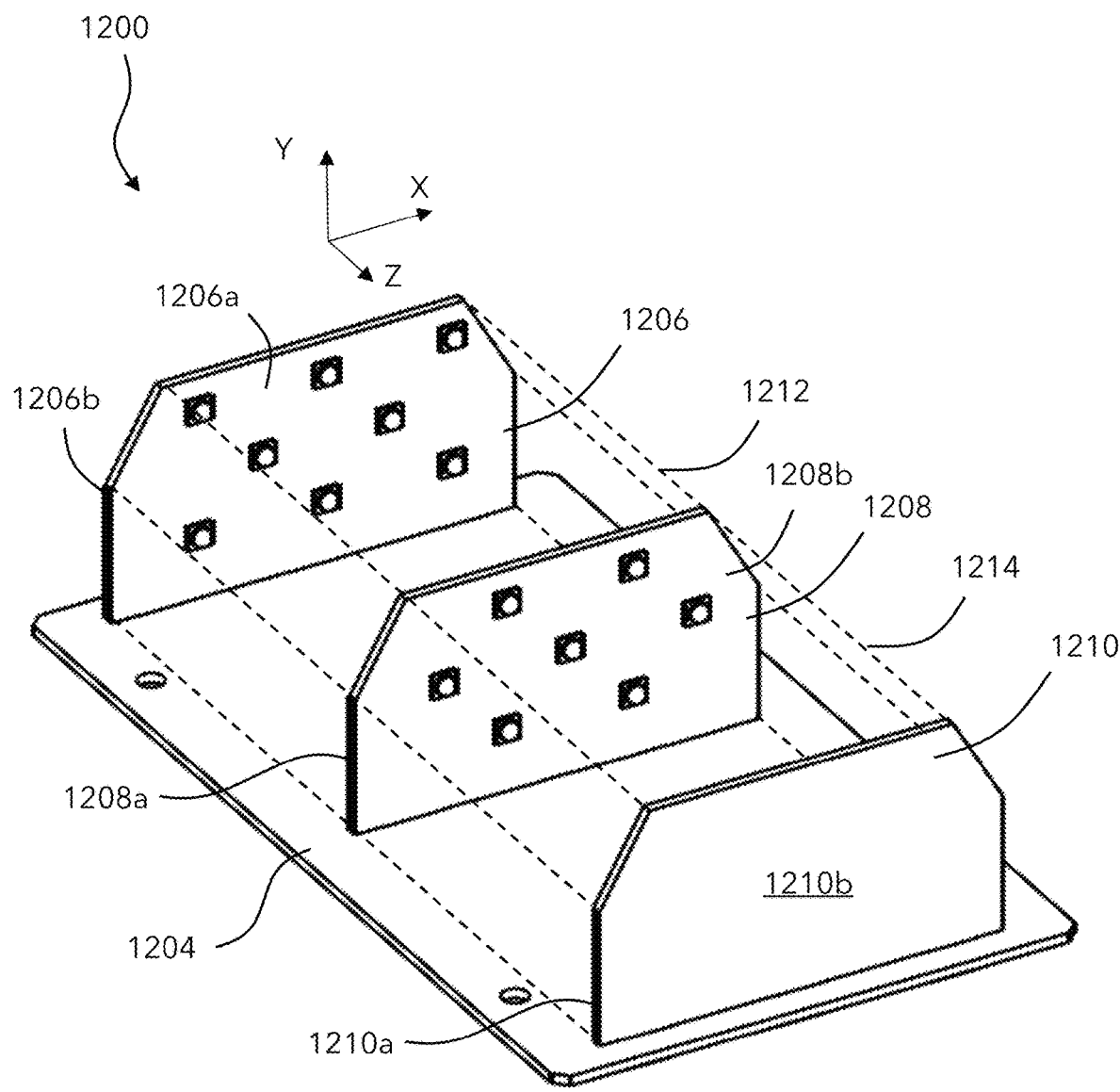
FIG. 13 is a perspective view of the part of FIG. 12.

Referring to FIG. 12, there is shown an embodiment in which the wall mounting plate assembly 152 is replaced with a wall mounting plate assembly 1300. The assembly 1300 is similar to the assembly 152, apart from the fact that the key presence detection sub-assembly 160 (which uses capacitive sensing) is replaced by a detector 1200, as will be described below.

Configuration

Referring to FIGS. 12 to 17, detector 1200 comprises a frame 1202 having a base plate 1204 and three sensor panels 1206, 1208, 1210 mounted normal thereto. The panels 1206, 1208, 1210 are spaced-apart. A first detection space 1212 is defined as the volume between the panels 1206, 1208, and a second detection space 1214 is defined as the volume between the panels 1210, 1212.

The first panel 1206 has a first side 1206a and a second side 1206b. The second panel 1208 has a first side 1208a and a second side 1208b. The third panel 1210 has a first side 1210a and a second side 1210b.

On the first side 1206a of the first panel 1206 there is provided an array 1216 of receivers. On the first side 1208a of the second panel 1208 there is provided an array 1218 of transmitters. On the second side 1208b of the second panel 1208b there is provided an array 1220 of transmitters. On the first side 1210a of the third panel 1210 there is provided an array 1222 of receivers.

Figure 14:
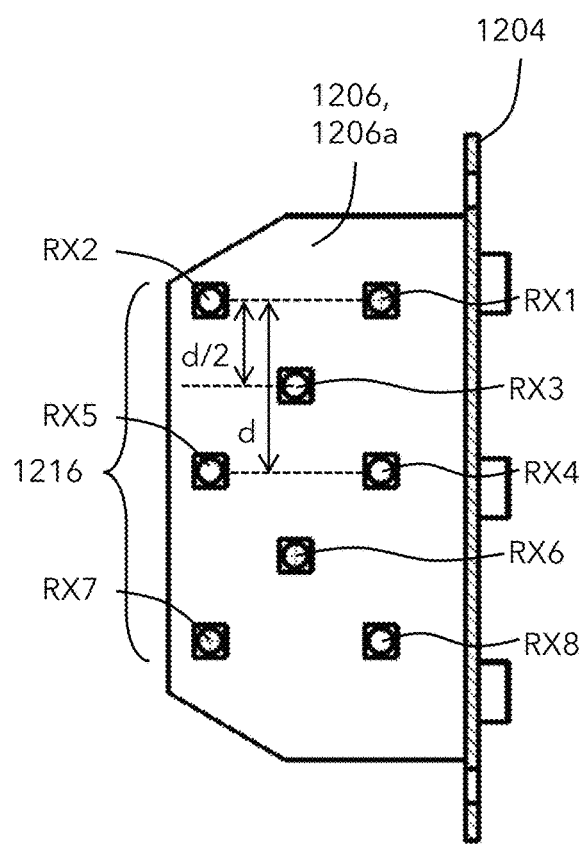
FIGS. 14 to 16 are side views of the part of FIG. 12.

FIG. 14 shows a side view of the first side 1206a of the panel 1206. The array 1216 comprises a plurality of receivers 1216a-1216h. The receivers 1216a-1216h are arranged in three columns (or rows if oriented at 90 degrees to that shown). The first column has three receivers, the second has two and the third, three. The receivers of the first and third columns are aligned. The receivers of the second column are positioned in between those of the first and third columns in a vertical sense. In other words, if the in-column spacing between the receivers is d, then the second column is offset by d/2. In this embodiment, d=20 mm. There are eight receivers. In this embodiment, the receivers are Vishay VEMD2020X01 infrared photodiodes.

A 74HC4051PW,118 8 channel multiplexer is used to enable each photodiode receiver as required. A 10 kΩ sense resistor converts the current to a voltage which is then amplified. First stage amplification is using a common emitter bandpass amplifier, second stage is an op-amp based bandpass filter, both centred on 20 kHz.

Figure 15:
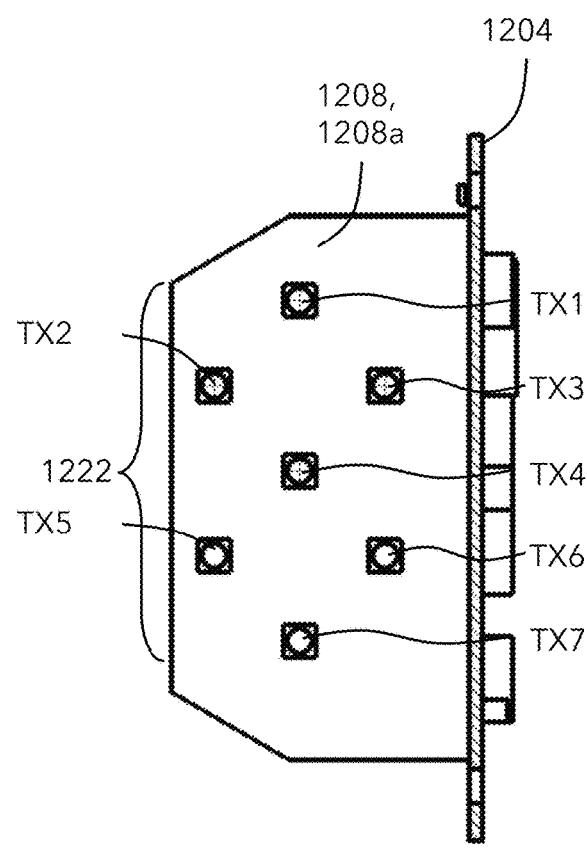
Figure 16:
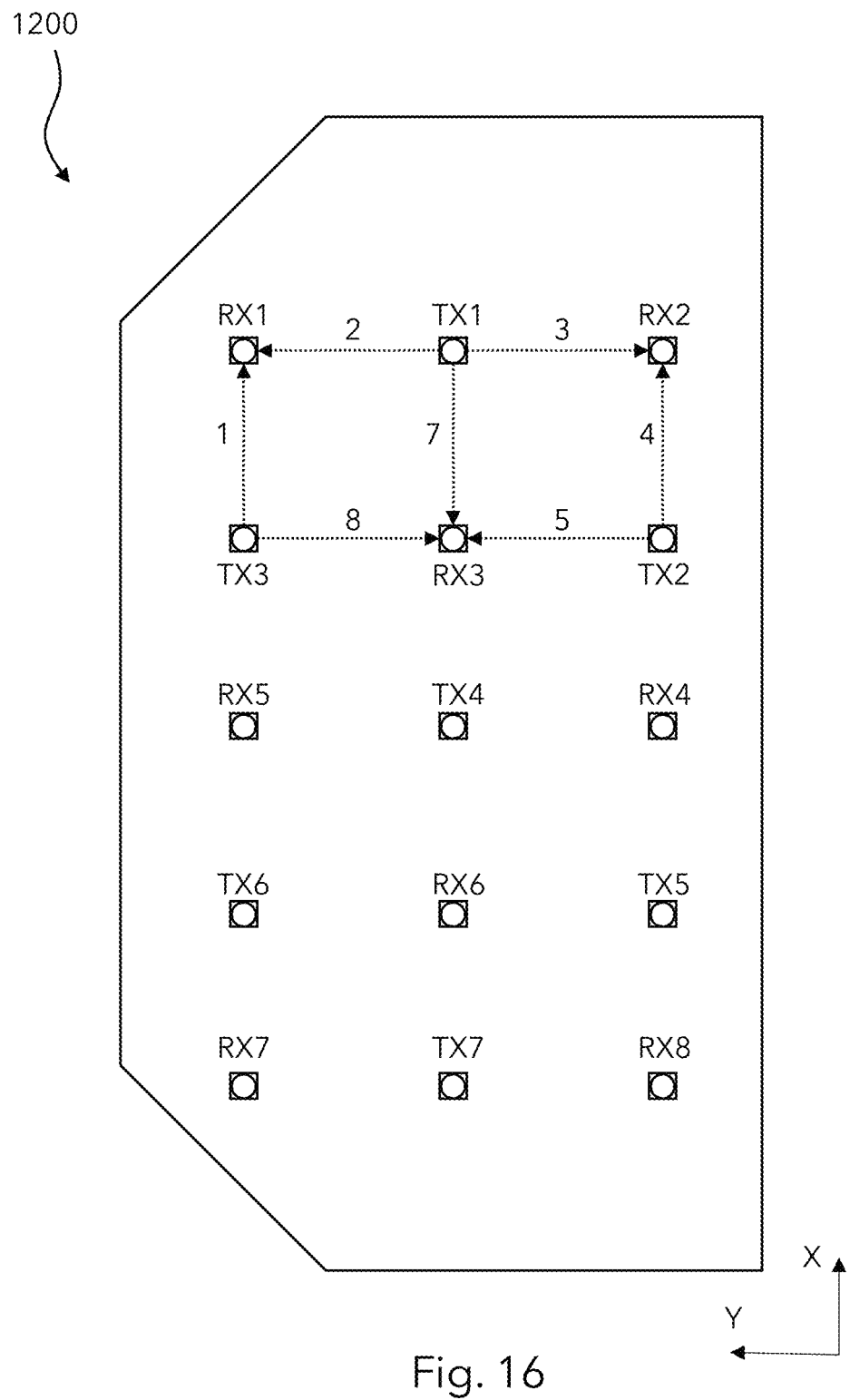

FIG. 15 shows a side view of the first side 1208a of the panel 1208. The array 1218 comprises a plurality of transmitters 1218a-1216g. The transmitters 1218a-1218g are arranged in three columns (or rows if oriented at 90 degrees to that shown). The first column has two transmitters, the second has three and the third, two. The transmitters of the first and third columns are aligned. The transmitters of the second column are positioned offset from those of the first and third columns in a vertical sense. In other words, if the in-column spacing between the transmitters is d, then the second column is offset by d/2. There are seven transmitters. In this embodiment, the transmitters are VSMB2943GX01 infrared LEDs.

Each LED is enabled using a BC847C transistor. Current flowing in the LED is controlled using 2× 1kΩ resistors in parallel (500Ω). Current in each LED is:

$$I_{LED} = \frac{(V_{supply} - V_f - V_{ON})}{R}$$

$$I_{LED} = \frac{(12 - 1.35 - 0.15)}{500}$$

$$I_{LED} = 21 \text{ mA}$$

The VSMB2943GX01 has an intensity of 20 mW/sr @ 100 mA. The gap between the two boards is 6.5 cm and each receiver is optically offset from its closest transmitter by 10 mm.

The transmission angle is $$\theta = \tan^{-1}\left(\frac{10}{65}\right) \cong 9^0$$

At 9°, the transmitted signal is reduced by approx. 7%. Transmitted intensity $$I_\theta = \frac{21 \text{ mA}}{100 \text{ mA}} \cdot 20 \text{ mW/sr} \cdot 0.93$$

$$I_{\theta(TX)} = 3.9 \text{ mW/sr}$$

Reverse light current in the VEMD2020X01 photodiode is 12 μA at 1 mW/cm² intensity. Light intensity reduces with the square of distance. The sensitivity of the photodiode is further reduced by approximately 15% at an angle of 9°. The current flowing in the receiver will be $$I_{\theta(RX)} = \frac{I_{\theta(TX)} \cdot 12 \,\mu\text{A cm}^{-2} \cdot 0.85}{6.5 \text{ cm}^2} = 940 \,\mu\text{A}$$

FIG. 5 shows the receivers (R) and transmitters (T) overlaid. It can be seen that rather than lying in line/parallel to each other, the transmitters and receivers are interdigitated on the XY plane (i.e., the planes of the panels). They form a regular grid of d/2×d/2 in the XY plane. The boards are designed such that the optical axes of each transmitter/receiver extend parallel to one another but are offset from one another, either vertically or horizontally.

In this way, each of the receivers can be designed to identify a "positive" receipt of the incident emitted light at the same level of intensity. If any of the receivers were positioned in the direct line of sight (opposite) the transmitters, they would receive light which has not been attenuated by the angle between transmitter and receiver. Therefore the receiver detection circuits (amplifiers and so on) would need to detect a positive across a broader range of amplitudes. This would make the circuits inherently more complex to implement. Therefore, by ensuring that each transmitter is the same distance/angle from multiple receivers (i.e. not directly opposite) provides for a simpler system.

Figure 17:
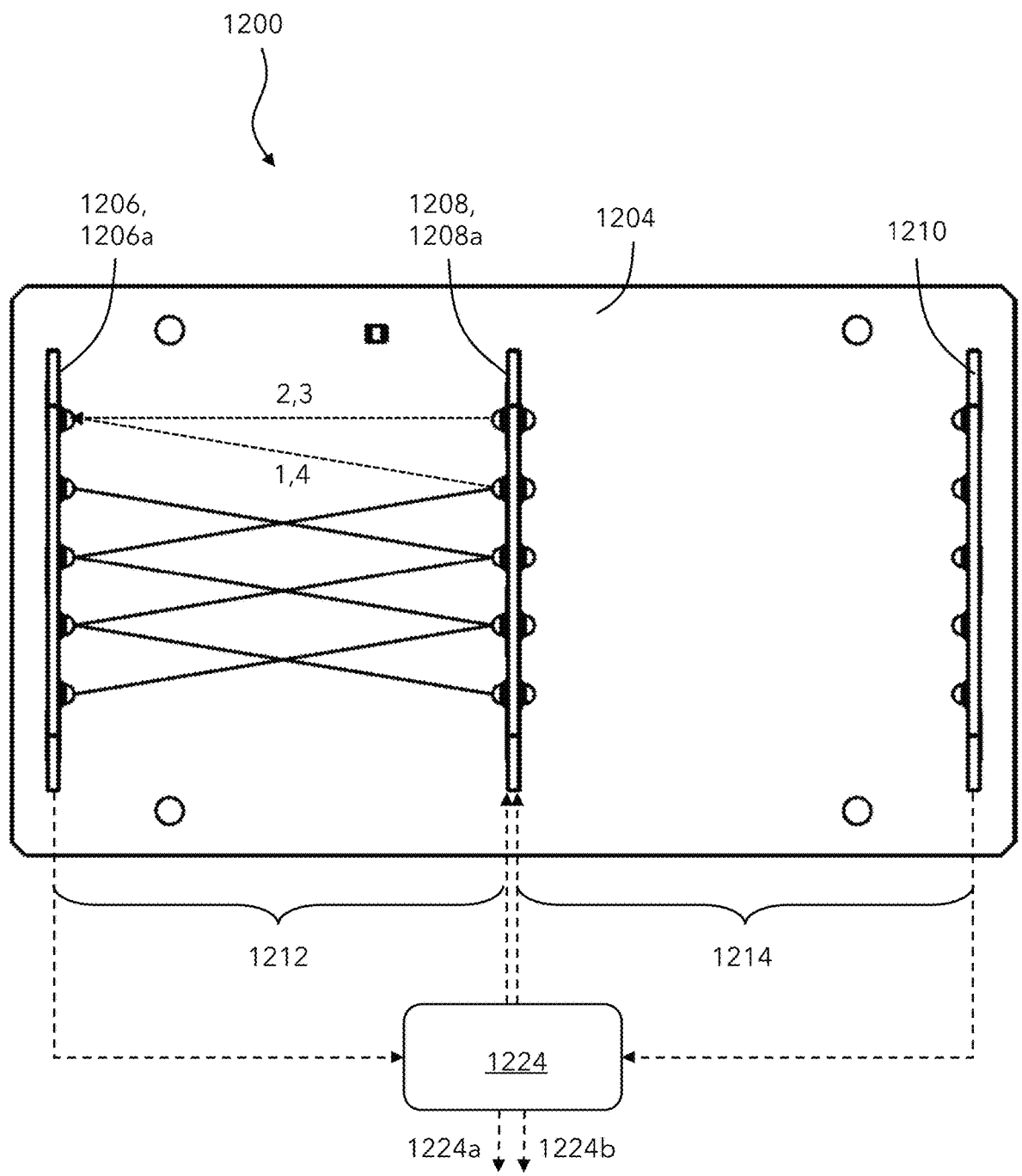
FIG. 17 is a front view of the part of FIG. 12.

FIG. 17 shows the apparatus 1200 connected to a controller 1224. The controller is configured to provide control signals to each of the emitters on either side 1208a, 1208b of the panel, and to receive signals from the receivers on the panels 1206, 1210 as described above. The controller 1224 is configured to provide outputs 1224a, 1224b indicative of the presence of an object in either of the detection spaces 1212, 1214.

Use

In use, detectors and emitters are activated in turn. This provides a pattern of beams directed from the panel 1208, across the detection space 1212 to the receivers on the panel 1206. As each beam is emitted, the relevant detector is used to determine whether the corresponding signal has been received. If the signal is not received, an object (specifically a key) is reported as detected in the space 1212 (OBSTRUCTED mode). As shown in the table below, the first pair is emitter TX2 with receiver RX1, and so on.

| Beam | Transmitter | Detector |
|------|-------------|----------|
| 1 | TX2 | RX1 |
| 2 | TX1 | RX1 |
| 3 | TX1 | RX2 |
| 4 | TX2 | RX2 |
| 5 | TX2 | RX3 |
| 6 | TX4 | RX3 |
| 7 | TX1 | RX3 |
| 8 | TX3 | RX3 |
| 9 | TX3 | RX4 |
| 10 | TX6 | RX4 |
| 11 | TX4 | RX4 |
| 12 | TX4 | RX5 |
| 13 | TX2 | RX5 |
| 14 | TX5 | RX5 |
| 15 | TX5 | RX6 |
| 16 | TX7 | RX6 |
| 17 | TX4 | RX6 |
| 18 | TX6 | RX6 |
| 19 | TX6 | RX7 |
| 20 | TX7 | RX7 |
| 21 | TX7 | RX8 |
| 22 | TX5 | RX8 |

The beam sequence can be modified using the following definitions

| #define | PULSECOUNT | 10 // Number of pulses per beam |
|---------|------------|----------------------------------|
| #define | INTER_BEAM_DELAY | 40 // cycle delay between beams @ 40 kHz |
| #define | END_OF_SEQUENCE_DELAY | 600 // cycle delay between @ 40 kHz |
| #define | MAXBEAMS | 22 // Number of beams is a sequence |
| #define | BEAM_DETECT_THRESHOLD | 8 // Pulses detected to confirm beam |
| #define | NUM_CLEAN_SWEEPS | 5 // Clean sweep threshold |

TIMER0 is used to generate a 25 μsec tick. The relevant output pin is toggled to generate a 20 kHz signal. This is disabled after (PULSECOUNT) cycles. The next TX/RX pair are enabled and after a delay (INTER_BEAM_DELAY), the next beam is generated. At the end of the sequence (MAXBEAMS), after a delay (END_OF_SEQUENCE_DELAY), the sequence repeats.

BEAM_DETECT_THRESHOLD defines the number of pulses which indicate a beam has been received. In this case it is slightly less than the number transmitted to provide limited noise filtering. Should a beam be obstructed and fewer pulses are received, the processor goes into OBSTRUCTED mode and sets the relevant output to HIGH (i.e., an object is present).

In order to exit OBSTRUCED mode, the system needs to see (NUM_CLEAN_SWEEPS) unobstructed sweeps before it will change state. This hysteresis prevents flickering of the output under certain circumstances.

Each detector detects the light from more than one transmitter. Each transmitter emits light for detection between more than one detector. Viewed in the XY plane, the beams create a grid pattern. The beams also have a Z axis component between the arrays. The beams in bold are shown in FIG. 5.

If, for example, the emitter TX4 is active (beams 6, 11 & 12), if (when polled) the photoreceivers RX3, RX4 or RX5 show a signal below a predetermined threshold, the presence of a key in the detection space is confirmed by the controller.

DESCRIPTION OF THE SIXTH EMBODIMENT

Figure 18:
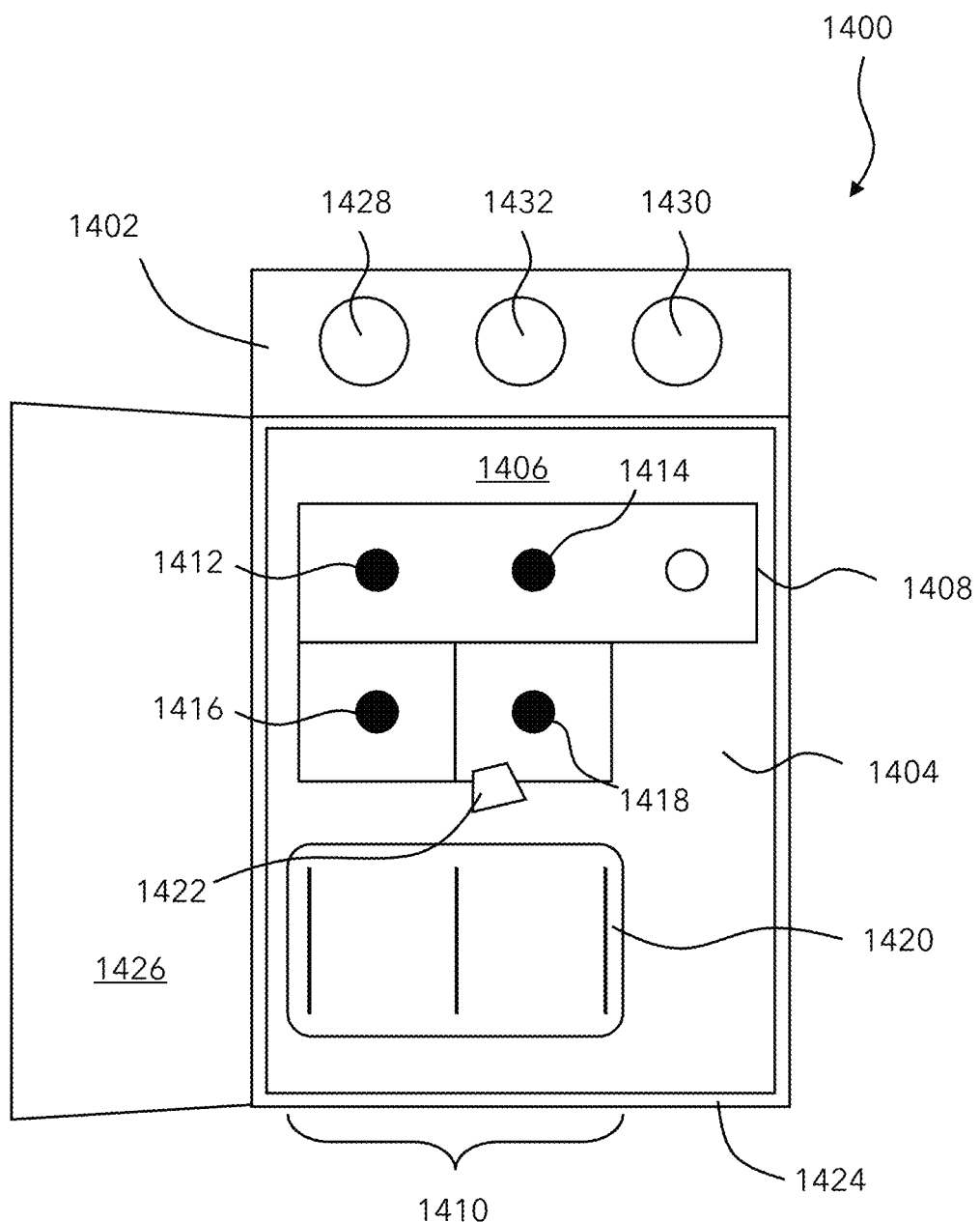
FIG. 18 is a front view of an exterior control unit in accordance with the present invention.

Referring to FIG. 18, an alternative exterior control unit 1400 is shown, which can be used in place of the unit 152.

The unit 1400 comprises a mounting plate assembly 1402 and an enclosure assembly 1404.

The mounting plate assembly 1402 comprises a backplate 1406, a fob-receiving sub-assembly 1408, and a key presence detection sub-assembly 1410.

The fob-receiving sub-assembly 1408 comprises a first array of fob receptacles 1412, 1414 and a second array of fob receptacles 1416, 1418. Each fob receptacle has an associated indicator light.

The fob receptacles are provided as follows:

Receptacles 1412, 1414 are site fob receptacles for live load and drop load respectively;

Receptacles 1416, 1418 are for an access fob and vehicle key fob respectively.

The key detection subassembly 1410 comprises a detector 1420 being similar in structure and function to the detector 1200, and a camera 1422. The camera of FIG. 18 is shown schematically only, and may vary in position and configuration (it may, for example, comprise multiple cameras).

The enclosure assembly 1404 acts as a lockable repository and comprises a secure box 1424 with an electronically lockable access door 1426, first indicator 1428, second indicator 1430 and button 1432.

Use

Figure 19:
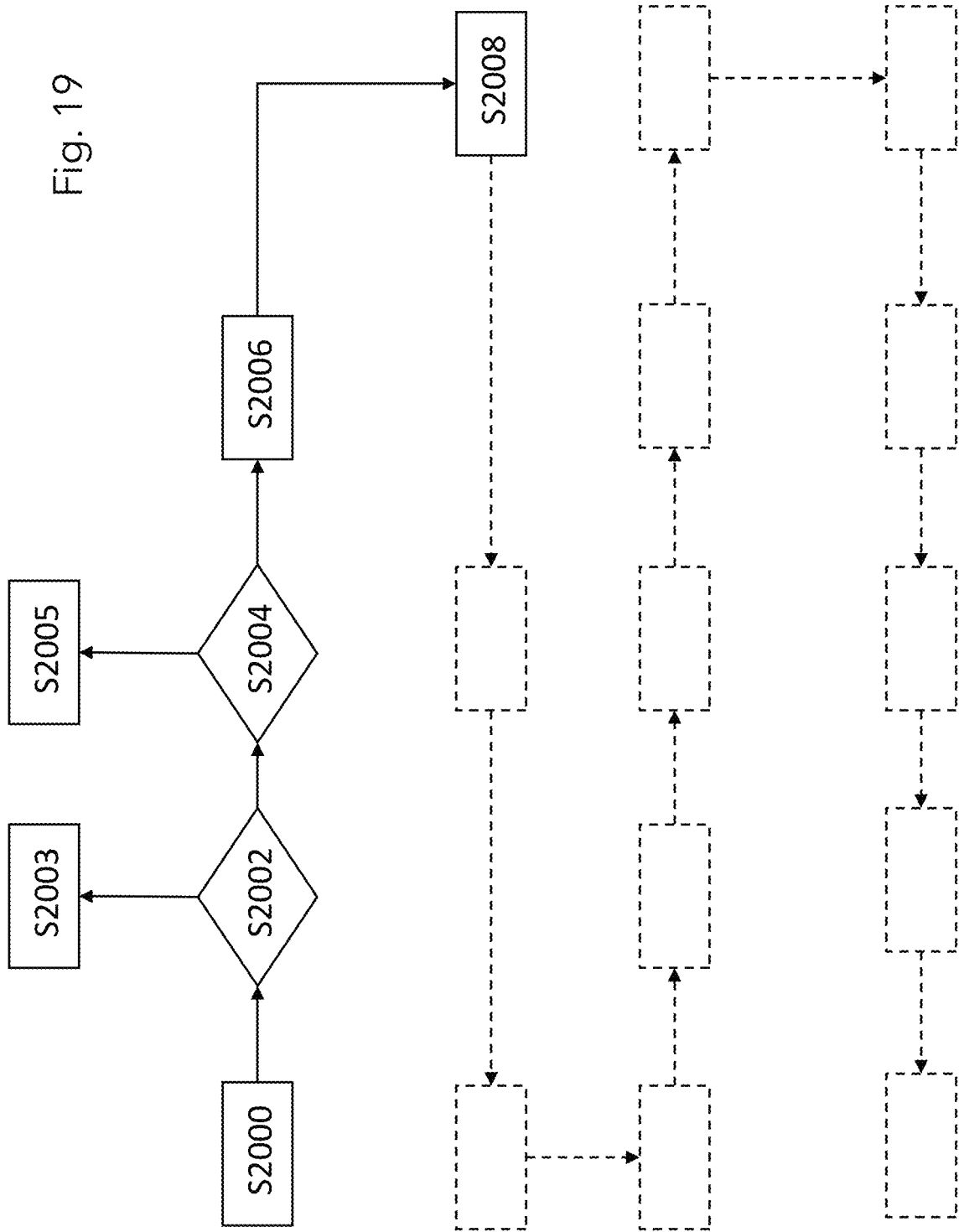
FIG. 19 is a process diagram for implementation with the first embodiment of the present invention.

Referring to FIG. 19, the algorithm described herein is stored on the memory of the system controller, and is merely an example of the type of process that the system can accept. The algorithm is based on a typical, standard industry workflow, and that workflow's implementation using a system according to the present invention:

The system is ready for use with the unit 1400 closed and locked, and a green access fob deposited in the receptacle 1416.

At step S2000 a vehicle arrives on-site and a fob is dispensed to the driver (automatically or by site personnel). He attaches the fob to the vehicle key. The driver manoeuvres the vehicle into position and turns the engine off.

At step S2002 the driver presses a button on the exterior unit 1400 to open the door 1426. He inserts the key fob into the receptacle 1418. If the fob is not authorised, not recognised or placed in the incorrect receptacle, the system proceeds to step S2003 where the relevant indicator light is lit red.

If the correct fob is inserted (the fob identity is checked against the controller's database) the system moves to S2004.

At step S2004, the key detection sensors 1420, 1422 are polled to determine whether the inserted vehicle fob(s) have a key attached. If not, step S2005 is initiated in which the relevant indicator light is lit red.

The method of operation of the sensor 1420 is discussed above, and is configured to detect the presence of an object. The system in addition captures an image of the key using the camera 1422. The image is processed with image recognition software (utilising machine learning/AI) to identify the type of key inserted. A separate system utilising ANPR compares the key shape to the vehicle type (retrieved from a database of tractor units vs registration plates) to confirm that the correct key for the tractor unit has been inserted. If so, the method proceeds.

At step S2006, the vehicle key receptacle 1418 has a vehicle key fob inserted and a key is detected. The indicator light is lit green. The access fob in the receptacle 1416 is released—this fob can be used directly, or is attached to a key or access card for driver rest facilities.

At step S2008, once the enclosure is secured, the system is ready for loading. The red light 1428 is deactivated and the green light 1430 is activated to show the exterior user that the system is ready for loading.

The system then proceeds as per FIG. 7, noting that upon finishing the system will verify return of the access fob to receptacle 1416.

As discussed above, the receptacles 1412, 1414 are for site fobs. This supports a different mode of operation whereby an authorised outdoor marshal can indicate that a live load or a drop load is present by inserting a special fob in either receptacle 1412 or 1414 respectively.

The site fob may be connected to a trailer or vehicle lock key, such as a mechanical lock or a stop sign lock.

Figure 20:
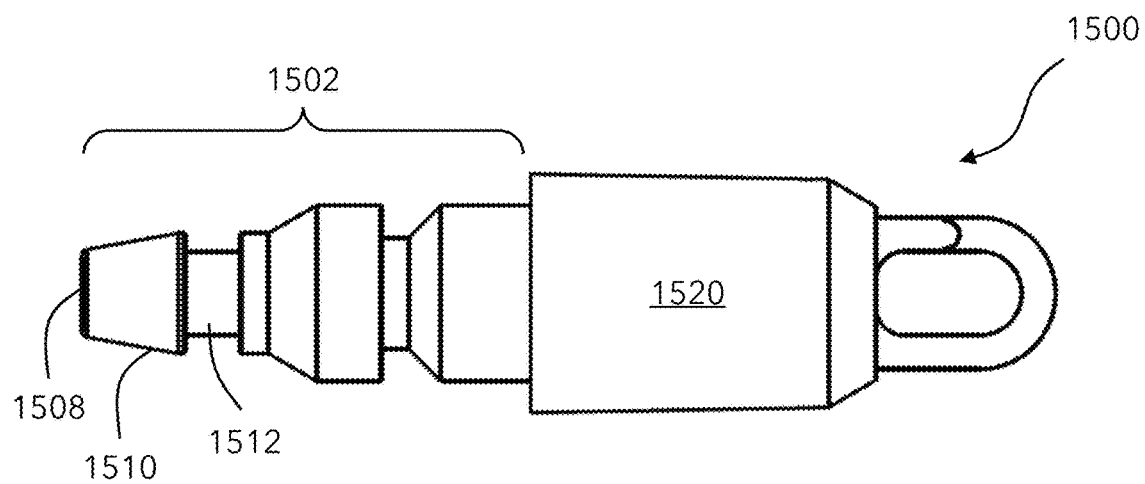
FIG. 20 is a side view of a fob in accordance with the present invention.
Figure 21:
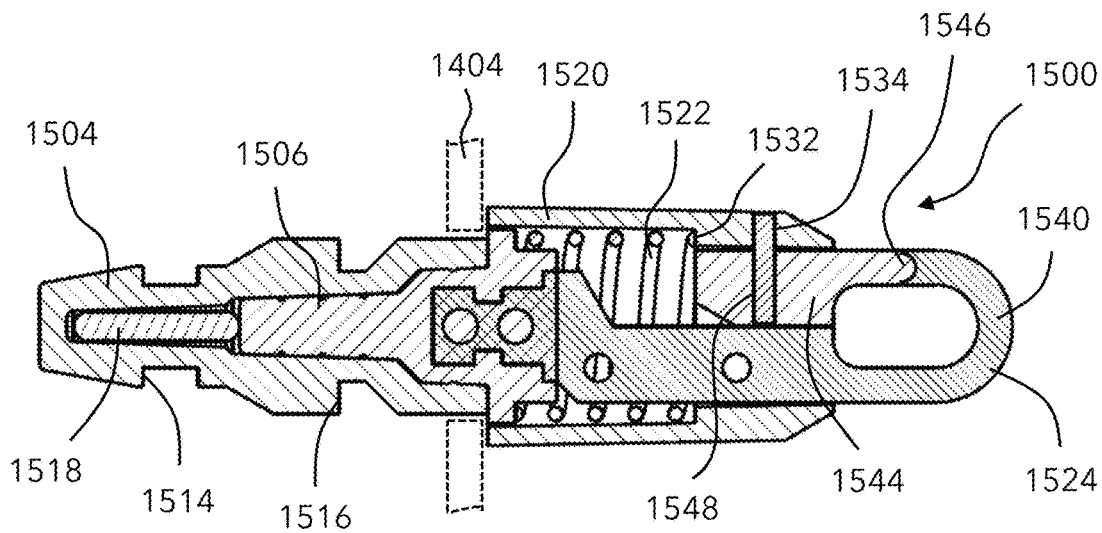
FIGS. 21 and 22 are section views of the fob of FIG. 20.
Figure 22:
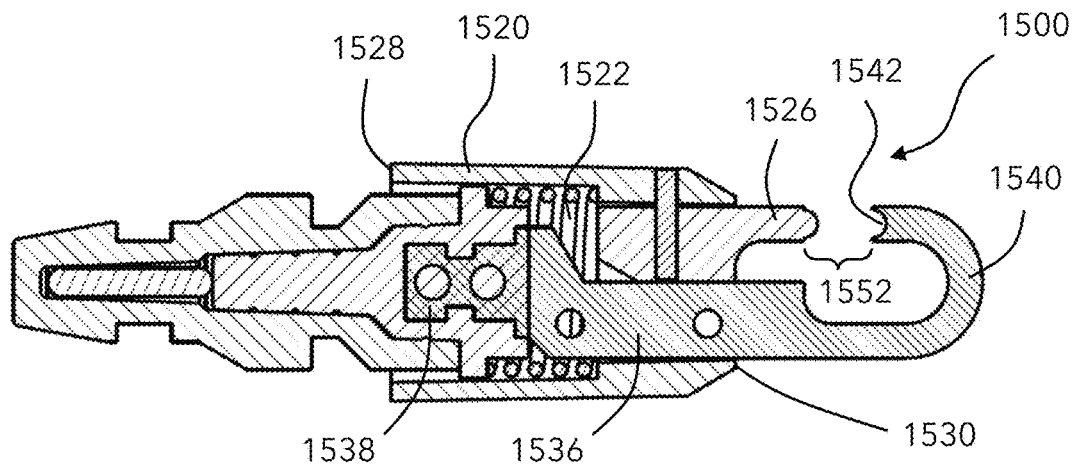

Turning to FIG. 20, a fob 1500 is provided which is particularly well suited for use with the sixth embodiment. In this embodiment, fobs are dispensed and attached to keys by the driver—the attachment of fob and key is not always permanent.

The fob 1500 comprises a two part fob tip component 1502, having a first part 1504 and a second part 1506, both of which are made of a glass filled plastic, or a durable plastic, such as acetal copolymer. Fob tip component 1502 is insertable into the aforementioned fob receptacles.

The fob tip component 1504 is generally hollow and is shaped internally to accommodate the distal portion of the fob component 1506. The fob tip component 1504 has a distal end 1508, tapered end portion 1510 and a neck portion 1512. A lip 1514 and a lip 1516 are relevant for insertion and locking respectively.

An RFID component 1518 is inserted into the end of fob tip component 1504. The RFID component 1518 comprises an antenna and an integrated circuit for uniquely identifying the particular component (and therefore fob 1500), as is known in the art. In this embodiment, the RFID component 1518 is passive.

The fob 1500 comprises a hollow sleeve 1520 containing a compression spring 1522, a first hook part 1524 and a second hook part 1526.

The sleeve 1520 is generally cylindrical defining a first axial end 1528 and a second axial end 1530. The sleeve defines an internal shoulder 1532 facing the first end 1528, and a radial bore 1534.

The first hook part 1524 has a base 1536 defining an attachment portion 1538 at a first end. At a second end of the base 1536 there is provided a J-shaped hook portion 1540 having a free end 1542.

The second hook portion 1526 comprises a body 1544 having a rearwardly projecting finger 1546, and an opening 1548.

Assembly

The first hook part 1524 is attached to the fob tip component 1502. In this embodiment, the part 1524 is constructed from metal and the second part 1506 of the fob tip component 1502 is overmoulded onto it.

The spring 1522 is arranged to bear against the second part 1506 of the fob tip component 1502 at a first end, and the sleeve is threaded over the hook portion 1524 to capture the spring with the shoulder 1532. A locating pin 1550 is passed into the openings 1534, 1548 to secure the second hook part 1544 with the sleeve 1520. In the rest position, the spring 1522 urges the second hook part 1544 into engagement with the first hook part 1524 to form a closed loop.

Use

The fob 1500 is the type picked up by the driver upon entry. In order to facilitate quick and easy attachment to the vehicle keys the sleeve 1520 can be moved towards the tip of the fob tip component 1502, compressing the spring. This draws the second hook component 1526 out of engagement with the free end 1542 of the first hook component 1540, providing a gap 1552 for insertion of a key loop or slit ring. Releasing the sleeve 1520 reforms the closed loop, retaining the fob with the key.

In use, as described above, the fob 1500 is retained within a fob receptacle such as receptacle 1418. It is undesirable to be able to remove the vehicle key once the fob is inserted (this would allow the system to be undermined and the vehicle to be driven whilst loading/unloading). Therefore the sleeve 1520 is dimensioned to be larger than the fob receptacle opening 1418 such that it bears against it when fully inserted into the receptacle.

When locked in place e.g. by a locking member engaging the lip 1514 or 1516, the end 1528 of the sleeve is very close to, or in abutment with, the surface of the enclosure 1404 defining the receptacle. Therefore the sleeve 1520 cannot physically be moved relative to the fob tip component 1502, securing the key(s) in place until the fob 1500 can be removed.

Variations

Figure 9:
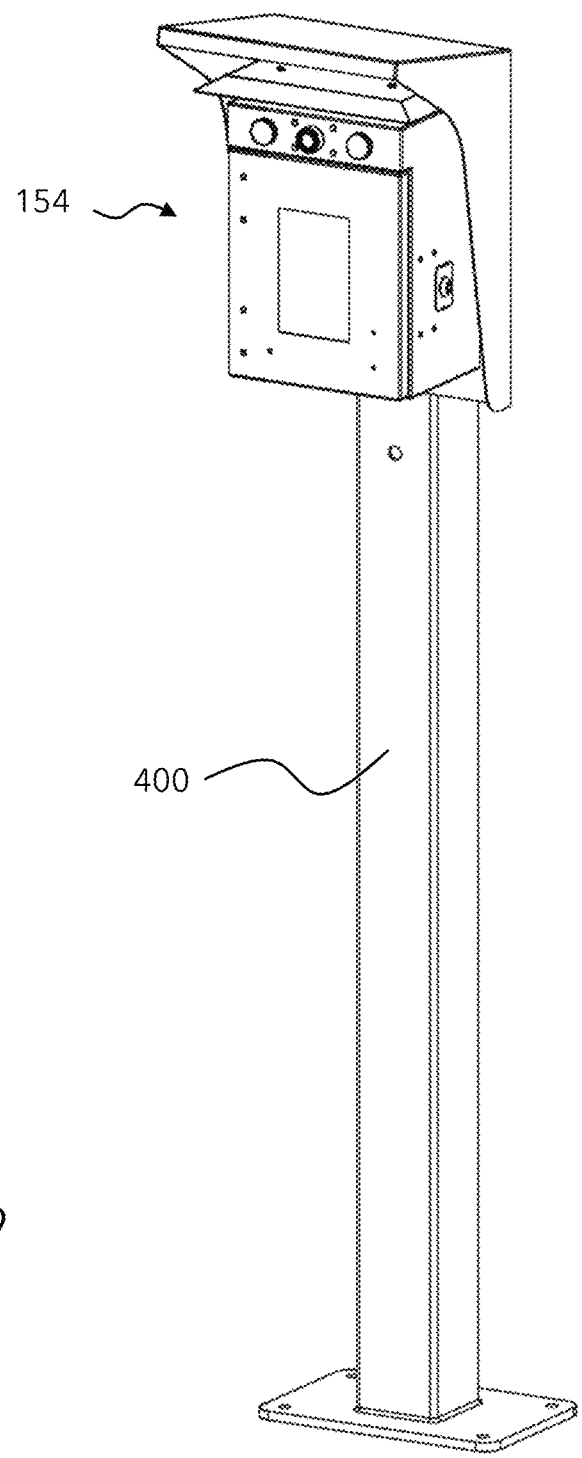
FIG. 9 is a perspective view of an alternative mounting arrangement for the unit(s) of the present invention.

The above embodiments have been described with both the control units attached to the interior and exterior surfaces of the warehouse wall. It will be noted that this is not essential—one or both units may be attached to e.g. pedestals projecting from the floor. This is shown in FIG. 9 in which the external unit is mounted on a pedestal 400. This is particularly advantageous for the exterior unit as it can be positioned adjacent the driver window to enable access without leaving the cab.

The above embodiment utilises site key verification, but this is optional. The essential feature is the presence of vehicle keys. Therefore step S1007 may be removed from the process.

The above system provides for a double lock on the exterior unit 154—the door is locked and each fob is locked in place. It will be understood that in alternative embodiments one of these locking systems may not be implemented. The important thing is that removal of the driver key fob (and therefore key) is impeded.

As well as the capacitive method and EM beam detectors discussed above, the key may be detected by alternative means, e.g., by a weight sensor.

As well as standard ignition keys (which need to be inserted into a key barrel in the vehicle), the system may be implemented with RF key systems. Such systems typically detect the presence of the key in the cab to allow the ignition to be activated. In such an embodiment, the exterior cabinet would either detect the key in the aforementioned manner (i.e., by capacitive detection), or may sense the key by the RF signal it produces. It is envisaged that the key box would be constructed in such a way that the vehicle would not be able to detect the key when it is within the box. This can be achieved with known materials and techniques such as using RF-opaque materials, creating a Faraday cage around the key or RF interference. The box may be painted in radio signal blocking paint creating dB attenuation. This technology makes the vehicles keys electromagnetically opaque by distributing electrostatic charges or radiation around the cage's exterior, thus protecting the keys from electric charges.

If using RFID keys, the fob may be dispensed with entirely. In this embodiment, the key is placed into a specific area of the key box, identification data obtained by RFID detection and sent to the controller 147 which verifies the key against its database, If the key is accepted, it is locked inside the key box when shut only whilst loading takes place, and released once completed.

It will be understood that the present system may be implemented with touchscreen control, and the GUI may be configured to be contextual (i.e. only allowing certain functions depending on where is system is in the algorithm of FIG. 7).

The present invention may include use of a gate house upon entry to a site. A supervisor can then either issue a fob (if required) or check that the driver key has a correctly attached fob.

An ANPR (automatic number plate recognition) system may be implemented on-site to confirm the presence of each vehicle on-site, and to match the received fob(s) with each plate.

A camera may be provided with the system, using image recognition to view the deposited key and check the key matches the expected vehicle (image recognition is used to determine key shape and type).

A mechanism for pressing a key button once the unit door is closed may be provided. This allows the key to emit a locking/unlocking signal which is detected and checked against the expected RFID key tag string stored against the vehicle in the local database to guarantee it is 100% that vehicle key.

Such a system may be configured by a registration process. On first registration with the key management system, the key is deposited into a key detection or docking station and an operating button is pressed three times. Each time the RFID encrypted string changes although a part of the string remains constant but unique to the vehicle. The system can use this string to associate the key to the vehicle and if received again once deposited in the relevant dock key box, guarantee it is that registered key that has been inserted.

In a further embodiment, the exterior unit may be provided in a pedestal or bollard that can retract into the floor.

The handle element of the fob may be constructed from another material such as metal or metal matrix composite. The tip is a plastic material—preferably glass filled plastic.

Other means of attaching the key to the fob are possible—the seal 205 is optional, and other ways of attaching a key to a fob can be envisaged by the person skilled in the art.

In the methods described above, for live loads it is necessary to alert the drive to completion of the process so the vehicle can be driven away. This can be achieved with an automated message (e.g., SMS) to a mobile device such as a cellular phone, or via a Bluetooth (or similar) pager which may vibrate or light up.

The invention claimed is:

1. A warehouse dock door control system comprising:
   a system controller;
   an interior side unit; and
   an exterior side unit comprising a token detector configured to detect and identify a token, the token having unique identification data associated therewith;
   wherein:
   the token detector includes a plurality of token receiving slots configured to detect the token and read the identification data associated therewith, once the token is inserted into one of the plurality of token receiving slots, wherein one of the plurality of token receiving slots is a slot position indicating a live load operation is to be performed, and another of the plurality of token receiving slots is a slot position indicating a drop load operation is to be performed; and
   the system controller is configured to:
   use the identification data to determine whether the token is an authorized token upon being inserted into one of the plurality of token receiving slots; in response to the inserted token being authorized, send a signal to the interior side unit to authorise opening of the dock door; and,
   receive a signal confirming that unloading and/or loading is complete and that the dock door is closed, and, in response, communicate with the exterior side unit to authorise movement of the trailer away from the dock door;
   wherein the system has:
   a first, 'live load' mode operation, wherein the token is associated with a vehicle tractor unit, when the token has been inserted into the slot position indicating a live load operation is to be performed; and
   a second, 'drop load' mode operation, wherein the token is associated with one or more of:
   an authorized user;
   a lock or other device configured to inhibit removal of a trailer from the bay; and
   a transmitter connected to a device configured to determine whether a trailer is connected to a tractor unit,
   when the token has been inserted into the slot position indicating a drop load operation is to be performed.

2. A warehouse dock door control system according to claim 1,
   wherein:
   the token detector is configured to sense the presence of the token within the token receptacle and to read the identification data associated therewith;
   the controller is configured to use the identification data to determine whether the token is an authorised token;
   in response to the determination, communicate with the interior side unit to authorise opening of the dock door.

3. A warehouse dock door control system according to claim 2, wherein the system controller is configured to control the exterior side unit to secure the token to inhibit removal therefrom until a signal is received indicating that a loading or unloading process is complete.

4. A warehouse dock door control system according to claim 2, wherein in the first, 'live load mode, the token is a vehicle key, or a token connected to a vehicle key.

5. A warehouse dock door control system according to claim 4, wherein the exterior side unit comprises at least one key fob receptacle configured to receive a key fob attached to a vehicle key.

6. A warehouse dock door control system according to claim 5, wherein the key fob receptacle comprises a fob detector configured to detect the presence of a key fob in the receptacle.

7. A warehouse dock door control system according to claim 6, wherein the fob detector comprises an RF component reader, which RFID component reader is configured to read the unique identification data from an RFID component associated with a fob, and to transmit the unique identification data to the controller.

8. A warehouse dock door control system according to claim 5, comprising a fob lock configured to selectively retain the fob within the receptacle to secure the key in a key repository.

9. A warehouse dock door control system according to claim 4, comprising a wireless key reader configured to read unique identification data from a key.

10. A warehouse dock door control system according to claim 4, wherein the key detection system comprises at least one of a weight sensor and a capacitive sensor.

11. A warehouse dock door control system according to claim 10, wherein the capacitive sensor is provided on a sloped surface directly below the key fob receptacle.

12. A warehouse dock door control system according to claim 4, wherein the key detection system comprises a key detection apparatus that detects a key on the basis of an interrupted beam.

13. A warehouse dock door control system according to claim 4, wherein the key detection system comprises a camera.

14. A warehouse dock door control system according to claim 13, wherein the camera is linked to an image processing computer comprising software configured to identify the presence of a vehicle key.

15. A warehouse dock door control system according to claim 13, comprising:
a vehicle identification system;
a database of vehicles or vehicle types linked to keys;
wherein the software is configured to identify the key and to verify that the key corresponds to the vehicle in the bay adjacent the dock door.

16. A warehouse dock door control system according to claim 15, wherein the vehicle identification system comprises a registration plate recognition system.

17. A warehouse dock door control system according to claim 16, wherein the vehicle registration is matched to a vehicle model, and in which the key corresponding to the vehicle model is looked up in the database to verify the key.

18. A warehouse dock door control system according to claim 4, comprising a key repository having a closure with an electronically controlled lock.

19. A warehouse dock door control system according to claim 4, wherein in the second, 'drop load' mode, the exterior side unit comprising a key detector configured to detect and identify a specific site key having unique identification data associated therewith;
wherein:
the key detector is configured to detect the presence of the key within a key repository and to read the identification data associated therewith;
the controller is configured to use the identification data to determine whether the site key is an authorised site key;
in response to the determination, communicate with the interior side unit to authorise opening of the dock door;
wherein the system controller is configured to control the exterior side unit to secure the site key in the key repository to inhibit removal therefrom until a signal is received indicating that a loading or unloading process is complete.

* * * * *